United States Patent
Chen et al.

(10) Patent No.: US 6,958,849 B2
(45) Date of Patent: *Oct. 25, 2005

(54) ELECTROPHORETIC DISPLAY WITH IMPROVED TEMPERATURE LATITUDE AND SWITCHING PERFORMANCE

(75) Inventors: Yajuan Chen, San Jose, CA (US); Jack Hou, Fremont, CA (US); Wan Peter Hsu, Fremont, CA (US); Rong-Chang Liang, Cupertino, CA (US)

(73) Assignee: SiPix Imaging Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/663,249

(22) Filed: Sep. 15, 2003

(65) Prior Publication Data

US 2004/0169633 A1 Sep. 2, 2004

Related U.S. Application Data

(60) Provisional application No. 60/411,854, filed on Sep. 18, 2002.

(51) Int. Cl.[7] ............................. G02B 26/00; G09G 3/34
(52) U.S. Cl. ......................... 359/296; 359/265; 345/107
(58) Field of Search ................................ 359/246, 265, 359/253, 452; 345/107; 430/32

(56) References Cited

U.S. PATENT DOCUMENTS

| | | | |
|---|---|---|---|
| 3,281,426 A | 10/1966 | Tiers | |
| 3,612,758 A | 10/1971 | Evans et al. | |
| 5,573,711 A | 11/1996 | Hou et al. | |
| 5,930,026 A | 7/1999 | Jacobson et al. | |
| 5,961,804 A | 10/1999 | Jacobson et al. | |
| 6,372,838 B1 | 4/2002 | Rao et al. | |
| 2002/0182544 A1 | 12/2002 | Chan-Park et al. | |
| 2003/0164480 A1 | 9/2003 | Wu et al. | |
| 2004/0030125 A1 * | 2/2004 | Li et al. ...................... | 540/126 |

FOREIGN PATENT DOCUMENTS

| | | |
|---|---|---|
| WO | WO 02/00748 | 1/2002 |
| WO | WO 03/057360 | 7/2003 |

OTHER PUBLICATIONS

U.S. Appl. No. 09/518,488, filed Mar. 2000, Liang et al.
U.S. Appl. No. 09/606,654, filed Jun. 2000, Liang et al.
U.S. Appl. No. 09/784,972, filed Feb. 2001, Chan–Park et al.
U.S. Appl. No. 10/335,051, filed Dec. 2002, Chen et al.
U.S. Appl. No. 10/335,210, filed Dec. 2002, Chen et al.
U.S. Appl. No. 10/632,171, filed Jul. 2003, Yu et al.
U.S. Appl. No. 10/439,428, filed May 2003, Li et al.
U.S. Appl. No. 10/330,899, filed Dec. 2002, Wu et al.
M.A. Hopper and V. Novotny, "An Electrophoretic Display, Its Properties, Model, and Addressing", IEEE Trans. Electro Dev., 26 (8): 1148–1152 (1979).
James M. Richmond, "Cationic Surfactants: Organic Chemistry", Surfactant Science Series, vol. 34 (1990), Marcel Dekker.
P. Gregory, "High Technology Applications of Organic Colorants", 1991, Plenum Publishing Corp.
F. J. Green, << Sigma–Aldrich Handbook of Stains, Dyes, and Indicators >>, 1990, Aldrich Chemical Co.
Arthur S. Diamond and David S. Weiss, << Handbook of Imaging Materials >> edited by A.S. Diamond and D.S. Weiss, 2001, Marcel Dekker.
Armido Struder, et al., << Fluorous Synthesis: Fluorous Protocols for the Ugi and Biginelli Multicomponent Condensations >>, J. Org. Chem. 62 : 2917–24 (1997).

(Continued)

*Primary Examiner*—Scott J. Sugarman
*Assistant Examiner*—Richard Hanig
(74) *Attorney, Agent, or Firm*—Howrey LLP

(57) ABSTRACT

The invention is directed to a novel electrophoretic fluid composition for improving the temperature latitude and switching performance of an electrophoretic display, particularly at low operation temperatures.

35 Claims, 5 Drawing Sheets

OTHER PUBLICATIONS

Chen, S.M., << The Applications for the Revolutionary Electronic Paper Technology >>, OPTO News & Letters, 2003, Jul., 102, pp 37–41 (in Chinese, English abstract attached, full translation available upon request).

Zang, H.M. and Liang, R.C., << Microcup Electronic Paper by Roll–to–Roll Manufacturing Processes >>, Spectrum, 2003, Summer, 16/2, pp16–21.

Liang, R.C. and Lee, H., << SiPix Microcup(R) Electronic Paper—An Introduction >>, Advanced Display, 2003, Jun., Issue 3, pp 4–9 (in Chinese, English abstract attached, full translation available upon request).

Liang, R.C. et al, << Microcup(R) Active and Passive Matrix Electrophoretic Displays by A Roll–to–Roll Manufacturing Processes >>, SID Digest, May 21–22, 2003, 20.1/R.C. Liang.

Chen, S.M., << The New Applications and the Dynamics of Companies >>, TRI, May, 2003 (in Chinese, English abstract attached, full translation available upon request).

Liang, R.C., et al., << Microcup® displays : Electronic paper by roll–to–roll Manufacturing Processes >>, *J. SID*, 11(4): 621–628 (2003).

Liang, R.C. et al, << Passive Matrix Microcup(R) Electrophoretic Displays >>, IDMC '03, Feb. 18–21, Taipei, Liang, Paper Fr–17–5.

Liang, R.C. and Tseng, S., << Microcup(R) LCD, A New Type of Dispersed LCD by A Roll–to–Roll Manufacturing Process >>, IDMC '03, Feb. 18–21, Taipei, Liang, Paper We–02–04.

Liang, R.C., << Microcup(R) Electrophoretic and Liquid Crystal Displays by Roll–to–Roll Manufacturing Processes >>, USDC Flexible Microelectronics & Displays Conference, Feb. 3–4, 2003, Phoenix, Arizona, USA.

Liang, R.C. et al, << Microcup Electrophoretic Displays by Roll–to–Roll Manufacturing Processes >>, IDW '02, Dec. 4–6, pp1337–1340.

R. C. Liang, << Newly–Developed Color Electronic Paper Promises—Unbeatable Production Efficiency >> Nikkei Microdevices, Dec. 2002 (in Japanese, with English translation).

* cited by examiner

ELECTROPHORETIC DISPLAY WITH IMPROVED TEMPERATURE LATITUDE AND SWITCHING PERFORMANCE

RELATED APPLICATIONS

This application claims the benefit of U.S. Provisional Application No. 60/411,854 filed Sep. 18, 2002, which is incorporated herein by reference in its entirety.

BACKGROUND OF THE INVENTION

1. Field of the Invention

The invention is directed to a novel electrophoretic fluid composition for improving temperature latitude and switching performance of an electrophoretic display, particularly at low operation temperatures.

2. Description of Related Art

The electrophoretic display (EPD) is a non-emissive device based on the electrophoresis phenomenon of charged pigment particles suspended in a solvent. It was first proposed in 1969. The display usually comprises two plates with electrodes placed opposing each other, separated by spacers. One of the electrodes is usually transparent. An electrophoretic fluid composed of a colored solvent with charged pigment particles dispersed therein is enclosed between the two plates. When a voltage difference is imposed between the two electrodes, the pigment particles migrate to one side or the other causing either the color of the pigment particles or the color of the solvent being seen from the viewing side. There are several different types of EPDs. In the partition type EPD (see M. A. Hopper and V. Novotny, IEEE Trans. Electr. Dev., 26(8):1148–1152 (1979)), there are partitions between the two electrodes for dividing the space into smaller cells in order to prevent undesired movement of particles, such as sedimentation. The microcapsule type EPD (as described in U.S. Pat. Nos. 5,961,804 and 5,930,026) has a substantially two dimensional arrangement of microcapsules each having therein an electrophoretic composition of a dielectric solvent and a suspension of charged pigment particles that visually contrast with the dielectric solvent. Another type of EPD (see U.S. Pat. No. 3,612,758) has electrophoretic cells that are formed from parallel line reservoirs. The channel-like electrophoretic cells are covered with, and in electrical contact with, transparent conductors. A layer of transparent glass from which side the panel is viewed overlies the transparent conductors.

An improved EPD technology was disclosed in co-pending applications, U.S. Ser. No. 09/518,488, filed on Mar. 3, 2000 (corresponding to WO 01/67170), U.S. Ser. No. 09/606,654, filed on Jun. 28, 2000 (corresponding to WO 02/01281) and U.S. Ser. No. 09/784,972, filed Feb. 15, 2001, corresponding to US Publication No. 2002-0182544 (corresponding to WO02/65215), all of which are incorporated herein by reference. The improved EPD cells or microcups may be prepared by a photolithographic process or a microembossing method. In the microembossing method, a layer of thermoplastic or thermoset precursor composition coated on a substrate layer is embossed to form the microcups of well-defined shape, size and aspect ratio. The microcups are then filled with an electrophoretic fluid and sealed with a sealing layer. A second substrate layer is laminated over the filled and sealed microcups, optionally with an adhesive layer.

For all types of electrophoretic displays, the dispersion contained within the individual cells of the display is undoubtedly one of the most crucial parts of the device. The dispersion, as stated earlier, usually is composed of pigment particles dispersed in a dielectric solvent. The composition of the dispersion determines, to a large extent, the life time, contrast ratio, switching rate, response waveform and bistability of the device.

An improved dispersion composition is disclosed in a copending application, U.S. Ser. No. 10/335,051 filed Dec. 31, 2002 (corresponding to WO 03/57360). The dispersion is prepared by a microencapsulation process involving the use of a reactive protective colloid or dispersant to form part of the charged shell of pigment microparticles or microcapsules. In the process, an internal phase dispersion comprising primary pigment particles, such as $TiO_2$ particles, a reactive monomer or oligomer and optionally a diluent is first emulsified into a continuous phase which comprises a reactive protective colloid in a fluorinated solvent or solvent mixture. During the emulsification step, a hard shell is formed around the internal phase particles as a result of the interfacial polymerization/crosslinking between the reactive monomer or oligomer from the internal phase and the reactive protective colloid from the continuous phase. The process allows the pigments to be density matched to the dielectric solvent. In addition, the reactive protective colloid is chemically bonded to the surface of the microcapsules, thus stabilizing the microcapsules and also improving the switching performance and longevity of the display. A charge controlling agent (CCA), particularly a reactive CCA as disclosed in the copending application, U.S. Ser. No. 10/335,210 filed Dec. 31, 2002 (corresponding to WO 03/58335), may also be incorporated into the shell of the microparticles to improve the particle size control and dispersion stability. As a result, the display performance such as longevity, image uniformity and switching performance are significantly improved.

Copending application U.S. Ser. No. 10/632,171, filed Jul. 30, 2003, discloses a method for improving the performance of an electrophoretic display which method comprises adding a fluorinated quaternary salt, fused ring or polynuclei derivatives or isomers thereof in either the internal phase or the continuous phase in a microencapsulation process for the formation of pigment-containing microcapsules or microparticles. The microencapsulation may be accomplished by direct or inverse emulsification. The method further comprises addition to the internal phase or continuous phase a fluorinated protective colloid, a second charge controlling agent, a second reactive monomer or oligomer or a combination thereof.

While the systems disclosed in the copending applications have provided a significant improvement in the display performance, the contrast ratio and response time, however, could be further improved, especially at low operating temperatures.

SUMMARY OF THE INVENTION

It has now been found that the temperature latitude and switching performance of an electrophoretic display may be further improved through the use of a certain solvent mixture optionally in combination with a certain dye mixture, in the electrophoretic fluid.

The first aspect of the invention is directed to a novel electrophoretic fluid which comprises charged pigment particles dispersed in a mixture which comprises a solvent selected from the group consisting of perfluoropolyethers and another solvent selected from the group consisting of hydrofluoropolyethers.

The second aspect of the invention is directed to a novel electrophoretic fluid comprising charged pigment particles dispersed in the mixture comprising a perfluoropolyether and a hydrofluoropolyether and the solvent mixture further comprising a mixture of a Si phthalocyanine or napthalocyanine dye and a Cu phthalocyanine or naphthalocyanine dye dissolved therein.

The charged pigment particles may be the primary pigment particles or pigment-containing microcapsules or microparticles.

The use of the solvent mixture of the invention provides a better control and formulation window in the viscosity and dielectric constant of the display fluid. In some cases, the solubility of dyes in the electrophoretic fluid is also improved. As a result, an EPD of a faster electro-optic response rate, a higher contrast ratio and better image uniformity can be achieved. Moreover, the use of the dye mixture in the display fluid in combination with the solvent mixture has shown to be surprisingly effective in improving the temperature latitude and switching performance of the display.

The third aspect of the invention is directed to an electrophoretic display in which the display cells are filled with one of the electrophoretic display fluids of the present invention.

BRIEF DESCRIPTION OF THE DRAWINGS

FIG. 2a shows the electro-optical response of the display of Example 2 measured at 0° C.; and FIG. 2b shows the effect of operation temperature on the optical response signal.

FIG. 3a shows the electro-optical response of the display of Example 3 measured at 0° C.; and FIG. 3b shows the effect of operation temperature on the optical response signal.

FIG. 4a shows the electro-optical response of the display of Example 4 measured at 0° C.; and FIG. 4b shows the effect of operation temperature on the optical response signal.

DETAILED DESCRIPTION OF THE INVENTION

Figure 1A:
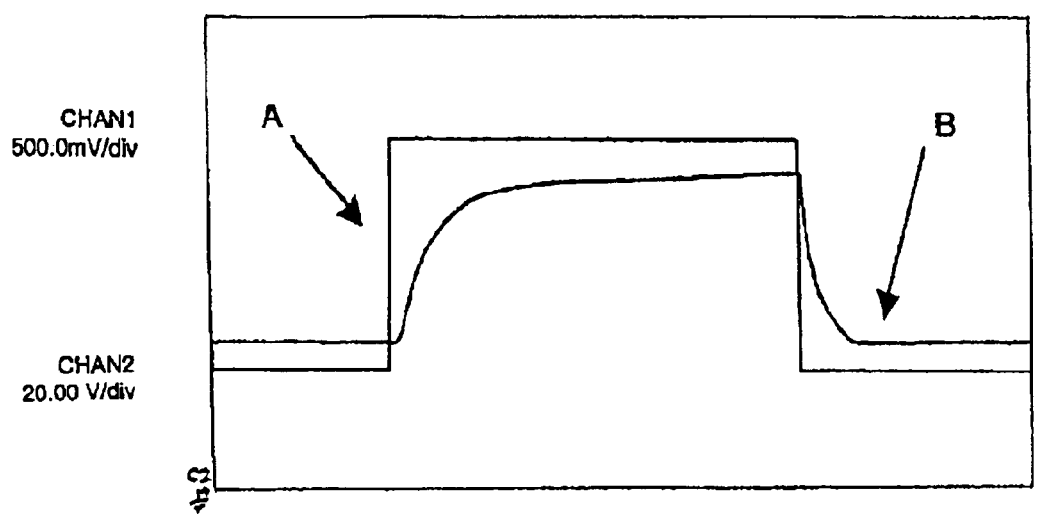
FIG. 1a shows the electro-optical response of a control sample (Comparative Example 1) measured at room temperature wherein A is the electrical input waveform and B is the optical output signal.

The first aspect of the invention is directed to a novel electrophoretic fluid which comprises charged pigment particles dispersed in a mixture comprising a perfluoropolyether and a hydrofluoropolyether.

Pigment Particles

The pigment particles may be the primary pigment particles which are preferably white, and may be organic or inorganic pigments, such as $TiO_2$. If colored pigment particles are used, they may be formed from organic or inorganic pigments, such as phthalocyanine blue, phthalocyanine green, diarylide yellow, diarylide AAOT yellow, and quinacridone, azo, rhodamine or perylene pigment series from Sun Chemical, Hansa yellow G particles from Kanto Chemical and Carbon Lampblack from Fisher. Particle size is preferably in the range of about 0.01–5 microns, more preferably in the range of about 0.05–2 microns. The particles should have acceptable optical characteristics, should not be swollen or softened by the dielectric solvent and should be chemically stable. The resulting suspension must also be stable against sedimentation, creaming or flocculation under normal operating conditions.

The pigment particles may exhibit a native charge, or may be charged explicitly using a charge control agent or may acquire a charge when suspended in the dielectric solvent. Suitable charge control agents are well known in the art; they may be polymeric or non-polymeric in nature and may also be ionic or non-ionic, including ionic surfactants such as Aerosol OT, sodium dodecylbenzenesulfonate, metal soap, polybutene succinimide, maleic anhydride copolymers, vinylpyridine copolymers, vinylpyrrolidone copolymer (such as Ganex from International Specialty Products), (meth)acrylic acid copolymers or N,N-dimethylaminoethyl (meth)acrylate copolymers. Fluorosurfactants are particularly useful as charge controlling agents in perfluorocarbon solvents. These include FC fluorosurfactants such as FC-170C, FC-171, FC-176, FC430, FC431 and FC-740 from 3M Company and Zonyl fluorosurfactants such as Zonyl FSA, FSE, FSN, FSN-100, FSO, FSO-100, FSD and UR from Dupont.

Suitable charged pigment dispersions may be manufactured by any of the well-known methods including grinding, milling, attriting, microfluidizing and ultrasonic techniques. For example, pigment particles in the form of a fine powder are added to the suspending solvent and the resulting mixture is ball milled or attrited for several hours to break up the highly agglomerated dry pigment powder into primary particles. Although less preferred, a dye or pigment for generating color of the suspending medium may be added to the suspension during the ball milling process.

Alternatively, the pigment particles may be pigment-containing microcapsules or microparticles which can be prepared chemically or physically. Typical microparticle forming/microencapsulation processes include interfacial polymerization, in-situ polymerization, phase separation, coacervation, electrostatic coating, spray drying, fluidized bed coating, solvent evaporation and the like. Electrophoretic microparticles prepared from any of the processes known in the art may be used in the present invention.

One of the preferred microparticle forming processes is disclosed in co-pending applications, U.S. Ser. No. 10/335,051 filed on Dec. 31, 2002 (corresponding to WO 03/57360), U.S. Ser. No. 10/335,210 filed on Dec. 31, 2002 (corresponding to WO 03/58335), U.S. Ser. No. 10/632,171, filed Jul. 30, 2003, the contents of all of which are incorporated herein in their entirety by reference.

The preparation of the pigment-containing microcapsules is disclosed in the co-pending applications, U.S. Ser. No. 10/335,210 (WO 03/58335), U.S. Ser. No. 10/335,051 (WO 03/57360), U.S. Ser. No. 10/632,171, filed Jul. 30, 2003, the contents of all of which are incorporated herein in their entirety by reference.

Briefly, the pigment-containing microcapsules may be prepared by a microencapsulation process involving the use of a reactive protective colloid (or dispersion agent) to form part of the charged shell of pigment-containing microparticles or microcapsules. In the process, an internal phase dispersion comprising primary pigment particles as described above, a reactive monomer or oligomer and optionally a diluent is emulsified into a continuous phase which comprises a reactive protective colloid and a charge controlling agent (CCA) in a fluorinated solvent or solvent mixture. During the emulsification step, a hard shell is formed around the internal phase particles as a result of the interfacial polymerization/crosslinking between the reactive monomer or oligomer from the internal phase and the reactive protective colloid from the continuous phase. The process allows the pigments to be density matched to the dielectric solvent. In addition, the reactive protective colloid is chemically bonded to the surface of the microcapsules, thus stabilizing the microcapsules and also improving the switching performance and longevity of the display. A reactive CCA to chemically bond the CCA to the particles or microcapsules is also very beneficial to improve the particle size control, dispersion stability and the display longevity. Suitable reactive CCAs and protective colloids or dispersants for the preparation of pigment-containing microparticles or microcapsules are disclosed in the copending applications, U.S. Ser. No. 10/335,210 (WO 03/58335) and U.S. Ser. No. 10/335,051 (WO 03/57360).

Suitable reactive monomers for interfacial polymerization/crosslinking include multifunctional isocyanates, isothiocyanates, epoxides, acid chlorides, chloroformates, alkoxysilanes, anhydrides, alcohols, thiols, amines and precondensates thereof. Preferred reactive monomers are multifunctional amines (primary and secondary), thiols, isocyanates, isothiocyanates, epoxides and precondensates thereof. The reactive monomer or oligomer is present in the amount of from about 5 to 300% by weight, more preferably from about 50 to 150% by weight and most preferably from about 80 to 120% by weight, based on the pigment microparticles or microcapsules.

To facilitate the emulsification process, a fugitive solvent or diluent may be used to reduce the viscosity of the pigment pre-dispersion and it is removed later by heat and/or vacuum during or after the emulsification step. To facilitate the stripping process, the boiling point of the fugitive diluent is preferably lower than about 160° C., more preferably lower than about 120° C. Examples of suitable fugitive solvents include acetone, methyl ethyl ketone (MEK), methyl propyl ketone, cycloheaxanone, ethyl acetate, propyl acetate, methylene chloride, tetrahydrofuran, toluene, xylene and the like.

The protective colloid preferably comprises a reactive functional group capable of reacting with the functional monomer or oligomer from the internal phase to form a crosslinked shell. Examples of suitable protective colloids include amino- or hydroxy-functionalized fluorinated, particularly perfluorinated polymers or oligomers derived from perfluoro hydrocarbons or perfluoropolyethers (from Du Pont and Solvay Solexis). The polyfluoroether amines represented by the following formula:

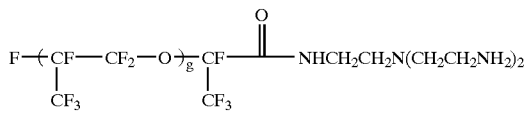

wherein g is 1–10,000, preferably 3–300, are particularly useful. Suitable polyfluoroether amines have a molecular weight ranging from about 300 to 50,000, preferably from about 500 to 15,000. They may be prepared under mild conditions by reacting a polyfluoroether substituted with at least one ester group having a multifunctional amine.

Suitable reactive charge controlling agents include the acid-base or donor-acceptor type charge control agents.

Suitable fluorinated solvents for the microencapsulation process generally have low vapor pressure, low viscosity and a dielectric constant in the range of about 1.7 to about 30, more preferably about 1.7 to about 5. Examples of suitable fluorinated solvents include, but are not limited to, perfluoro solvents such as perfluoroalkanes or perfluorocycloalkanes (e.g., perfluorodecalin), perfluoroarylalkanes (e.g., perfluorotoluene or perfluoroxylene), perfluoro-tert-amines, perfluoropolyethers such as those from Galden/Fomblin and perfluoropolyethers HT series and hydrofluoropolyethers (ZT series) from Solvay Solexis, FC-43 (heptacosafluorotributylamine), FC-70 (perfluorotri-n-pentylamine), PF-5060 or PF-5060DL (perfluorohexane) from 3M Company (St. Paul, Minn.), low molecular weight (preferably less than about 50,000, more preferably less than about 20,000) polymers or oligomers such as poly (perfluoropropylene oxide) from TCI America (Portland, Oreg.), poly(chlorotrifluoroethylene) such as Halocarbon Oils from Halocarbon Product Corp. (River Edge, N.J.) and Demnum lubricating oils from Daikin Industries. Perfluoropolyethers and hydrofluoropolyethers such as Solvay Solexis HT-170, HT-200, HT-230, ZT-180 and Dupont trifluoro(trifluoromethyl)-oxirane homopolymers (such as K-6 and K-7 fluids) are particularly useful.

The microencapsulation process may also be carried out in a solvent mixture comprising a perfluoropolyether and a hydrofluoropolyether. Preferred examples of perfluoropolyethers include Solvay Solexis HT series and Dupont K series [trifluoro(trifluoromethyl)-oxirane] homopolymers. Preferred examples of hydrofluoropolyethers include Solvay Solexis ZT series.

The preparation of pigment-containing microcapsules may be further improved by a microencapsulation process involving the use of a fluorinated quaternary salt or the fused ring or polynuclei derivatives or isomers thereof. The internal phase dispersion of the process comprises primary pigment particles and a reactive monomer or oligomer as described above. The continuous phase may optionally comprise a reactive protective colloid in a fluorinated solvent. The quaternary salt or derivatives thereof may be added to the internal dispersion phase, the continuous phase or both, depending on the solubility of the quaternary salt.

The emulsification of the internal dispersion phase and the continuous phase may be either a direct or inverse emulsification process. In the case of direct emulsification, the primary pigment particle dispersion ("I" phase) may be directly emulsified into the fluorinated solution ("F" phase). In the case of inverse emulsification, the fluorinated solution (the "F" phase) is gradually added and emulsified into the internal phase to first form an F-in-I (or F/I) emulsion. As the volume fraction of the "F" phase increases, the emulsion undergoes a phase inversion, i.e., the "F" phase becomes the continuous phase and the "I" phase becomes the dispersed phase to form an I-in-F (or I/F) emulsion. The phase inversion point may vary depending on the addition rate of the "F" phase, shear rate of the mixing and chemical properties such as interfacial tension and viscosity of the two phases.

After the phase inversion is completed, more reactive protective colloid and/or the fluorinated quaternary salt or a derivative thereof may be added to achieve a better colloidal stability and a more complete interfacial reaction at the particle surface.

The total concentration of the protective colloid used may range from about 0.1 to about 30% by weight, preferably from about 1 to about 20% by weight, based on the internal phase ("I"-phase). The concentrations of the protective colloid and the fluorinated quaternary salt or derivatives thereof in the process may be adjusted for optimal efficiency of the microencapsulation process.

Suitable quaternary salts include the pyridinium, quinolinium, ammonium, acridinium, azolium salts or fused ring or polynuclei derivatives or isomers thereof. The quaternary salts in general may be found in "Cationic Surfactants: Organic Chemistry", Surfactant Science Series Vol. 34 (1990), Marcel Dekker; "High Technology Applications of Organic Colorants" by P. Gregory, (1991), Plenum Publishing Corp.; "The Sigma-Aldrich Handbook of Stains, Dyes, and Indicators" by F. J. Green, (1990), Aldrich Chemical Co.; and "Handbook of Imaging Materials" edited by A. S. Diamond and D. S. Weiss; (2001), Marcel Dekker. The specific quaternary salts suitable for this invention are disclosed in the copending applications, U.S. Ser. No. 10/632,171, filed Jul. 30, 2003.

Mixture of Solvents

As indicated above, in the context of the present invention, charged pigment particles are dispersed in a mixture comprising a perfluoropolyether and a hydrofluoropolyether. The perfluoropolyether solvent preferably has an average molecular weight of about 200–2000, more preferably about 700–1200. The hydrofluoropolyether solvent preferably has an average molecular weight of about 200–1500, more preferably about 400–1000.

The weight ratio of hydrofluoropolyether to perfluoropolyether in the mixture may range from about 2/98 to about 98/2, preferably from about 5/95 to about 50/50, most preferably from about 8/92 to about 30/70.

The term, "polyether", is a polymer moiety comprising one or more alkylene oxides. Preferably a polyether in the present application is a polymer moiety comprising one or more alkylene oxides such as methylene oxide, ethylene oxide or linear or branched propylene oxide.

Preferred examples of perfluoropolyethers include Solvay Solexis HT series and Dupont K series.

Solvay Solexis HT (Heat Transfer) series (Galden®) is a line of fluids with boiling points ranging from about 55° C. to 270° C. and pour points from about −115° C. to −60° C. The molecular weights of the Galden® HT series range from about 300–1600, preferably about 700–1100. In this series, HT170 (average molecular weight 760), HT200 (average molecular weight 870) and HT230 (average molecular weight 1020) are more preferred.

Dupont K series (Krytox®) is a line of fluids which are homopolymers of trifluoro(trifluoromethyl)oxirane. The fluids have boiling points ranging from about 180° C. to 300° C. and pour points from about −95° C. to −70° C. The molecular weights of the K-fluids range from about 800 to 1500, preferably about 900–1200. In this series, K6 and K7 are more preferred.

Preferred examples of hydrofluoropolyethers include Solvay Solexis ZT series. Solvay Solexis ZT series (H-Galden®) is a line of fluids with boiling points ranging from about 85° C. to 180° C. and pour points from about −123° C. to −110° C. The molecular weights of the H-Galden® ZT series range from about 350–700, preferably about 500–700. In this series, ZT180 is more preferred.

The microencapsulation process as described above for the formation of the pigment-containing microcapsules may be carried out in the solvent mixture of the invention or in a different solvent or solvent mixture. If the microencapsulation is carried out in the solvent mixture of the invention, the solvent mixture with the pigment-containing microcapsules formed therein may be directly used as the electrophoretic fluid. However, if the microencapsulation process is carried out in a different solvent, the microcapsules formed then have to be isolated from the solvent and re-dispersed into the solvent mixture of the invention to form the electrophoretic fluid.

The second aspect of the invention is directed to a novel electrophoretic fluid which comprises (1) charged pigment particles dispersed in the solvent mixture of the invention, and (2) a mixture of a Si phthalocyanine or napthalocyanine dye and a Cu phthalocyanine or naphthalocyanine dye.

Mixture of the Dyes

The charged primary pigment particles or the charged pigment-containing microcapsules or microparticles prepared from the process as described above are dispersed in the solvent mixture. A mixture of dyes is also added and dissolved in the solvent mixture. The Si phthalocyanine or napthalocyanine dyes disclosed in a copending application, Ser. No. 10/439,428, filed May 15, 2003 are represented by the following formulas:

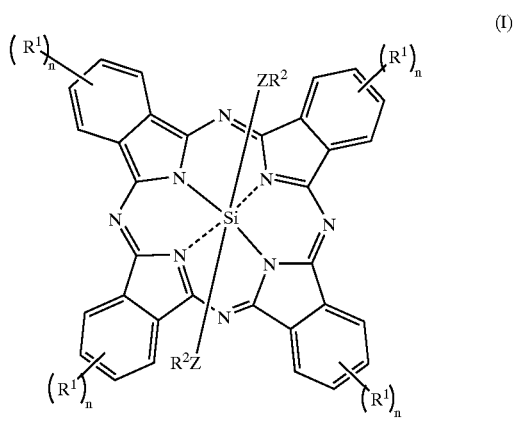

(I)

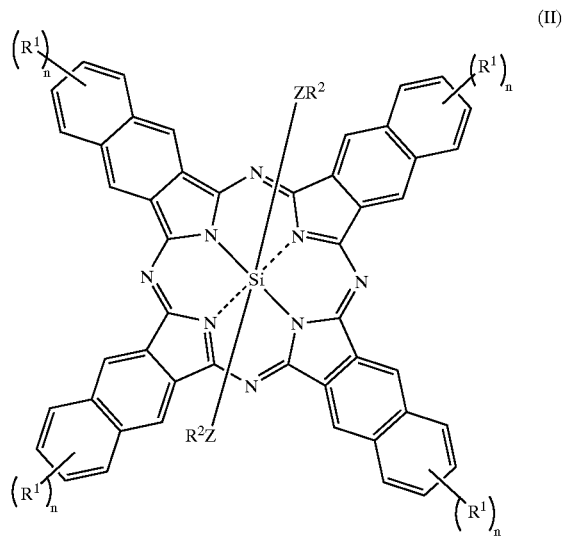

(II)

wherein:
each n is individually 0–4 for silicon phthalocyanine (I) or 0–6 for silicon naphthalocyanine (II);
$R^1$ is independently $R_f$-A-(wherein $R_f$ is as defined below and A is a single bond, —$CH_2O$—, —$CH_2CH_2O$— or —CO—), alkyl, heteroalkyl, aryl, heteroaryl, heteroalkylaryl, alkyl-heteroaryl, heteroarylalkyl aryl-heteroalkyl, R'O—, R'S—, R'R"N—, R'CO—, R'OCC—, R'COO—, R'CONR"—, R'R"NCO—, R'NHCONR"—, R'SO$_2$NR"— or R'R"NSO$_2$— (in which R' and R" are independently hydrogen, R$_f$ (as defined below), alkyl, heteroalkyl, aryl, heteroaryl, heteroarylalkyl, arylheteroalkyl, heteroalkyaryl or alkyl-heteroaryl) or halogenated, particularly fluorinated derivatives thereof;

Z is O or NR' wherein R' is defined as above;

R$^2$ is hydrogen, R$_f$—B— (wherein R$_f$ is as defined below and B is a single bond, —CH$_2$— or —CH$_2$CH$_2$—), alkyl, heteroalkyl or halogenated, particularly fluorinated derivatives thereof, or —SiR$^3$R$^4$R$^5$ wherein R$^3$, R$^4$, and R$^5$ are independently an alkyl or fluoroalkyl group of 1 to 20 carbon atoms or alkoxy or fluoroalkoxy of 2 to 40 carbon atoms; and R$_f$ is a low molecular weight (100–100,000) fluorinated polymeric or oligomeric moiety prepared from one or more types of fluorinated monomers.

Useful fluorinated monomers may include, but are not limited to, epoxide, hydrofuran, cyclolactone, cyclolactam, acrylate, methacrylate, styrene, vinylether and vinylalkane.

The substituents, R$^1$, R$^2$, R$^3$, R$^4$, R$^5$, R$_f$, and n are so selected that the total fluorine content of the silicon phthalocyanine dye is at least about 20%, preferably at least about 30% and more preferably at least about 50%, by weight of the dye molecule.

It will be recognized that when the preparation of the compounds involves the reaction of a formed phthalocyanine/naphthalocyanine or silicon phthalocyanine/naphthalocyanine with a reagent that inserts R$^1$ groups, the resulting product may be a mixture of compounds having different degrees of R$^1$ substitution on the phthalocyanine/naphthalocyanine rings, so that n, when not 0, may be different on each of the phenyl or naphthyl moiety within a compound; and it will also be recognized that substitution may occur at different positions on the different phenyl/naphthyl rings of the phthalocyanine/naphthalocyanine; and all such compounds are within the scope of the present invention. In addition, when n is not 0, not all R$^1$ groups need be the same, either within the compound as a whole or even on a particular phenyl or naphthyl moiety within a compound.

In the compounds of Formula (I) and (II), n is preferably 0–2, preferably 0–1. For example, n may be 0.

Each R$^1$ is independently an alkyl or alkoxy group, preferably a halogenated alkyl or alkoxy group, more preferably a fluorinated alkyl or alkoxy group. Especially preferred R$^1$ groups are fluorinated, especially completely fluorinated alkyl of 1 to 12 carbon atoms, more preferably 6 to 10 carbon atoms.

The substituent, Z, is preferably oxygen.

The substituent, R$^2$, is preferably hydrogen, R$_f$—CH$_2$—, alkyl and fluoroalkyl as defined above or —SiR$^3$R$^4$R$^5$ wherein R$^3$, R$^4$ and R$^5$ are independently an alkyl group such as methyl, a fluorinated alkyl chain of 6 to 12 carbon atoms or a fluorinated alkoxy of 6 to 18 carbon atoms. In one embodiment, R$^3$, R$^4$ and R$^5$ may be independently an alkyl, a fluorinated alkyl such as —(CH$_2$)$_2$(CF$_2$)$_5$CF$_3$ or —(CH$_2$)$_2$(CF$_2$)$_7$CF$_3$ or a fluorinated alkoxy such as —OCH$_2$(CF$_2$)$_{12}$CF$_3$ or —OCH$_2$(CF$_2$)$_6$CF$_3$.

These Si dyes can be prepared by conventional methods as described in the copending U.S. patent application, Ser. No. 10/439,428, filed May 15, 2003.

The Cu phthalocyanine dyes useful for the present invention are disclosed in U.S. Pat. No. 3,281,426. The most preferred Cu dye may be represented by the following formula:

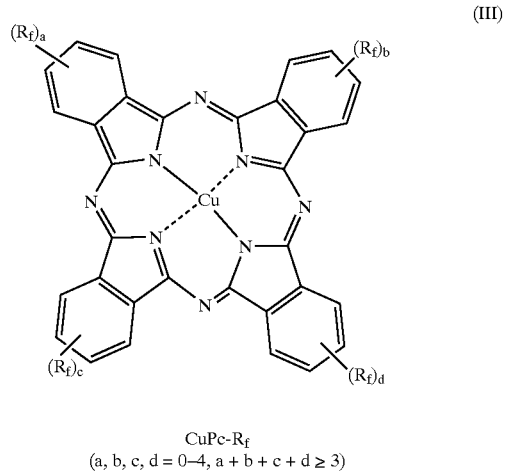

(III)

CuPc-R$_f$
(a, b, c, d = 0–4, a + b + c + d ≥ 3)

The weight ratio of the Si dye to the Cu dye is from about 1/10 to about 10/1, preferably from about 1/4 to about 4/1, more preferably about 1/2 to about 2/1.

The third aspect of the invention is directed to an electrophoretic display comprising display cells filled with an electrophoretic display fluid of the first or second aspect of the invention. The display may be the conventional partition type display, or the display prepared by the microencapsulation process as described in U.S. Pat. Nos. 5,961,804 and 5,930,026 or the display prepared by the microcup technology as described in WO01/67170.

EXAMPLES

The following examples are given to enable those skilled in the art to more clearly understand, and to practice, the present invention. They should not be considered as limiting the scope of the invention, but merely as being illustrative and representative thereof.

Preparation 1

Synthesis of a Reactive Protective Colloid R$_f$-amine

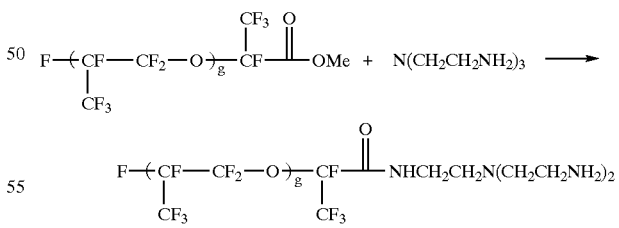

17.8 Gm of Krytox® methyl ester (DuPont, MW=about 1780, g=about 10) was dissolved in a solvent mixture containing 12 gm of 1,1,2-trichlorotrifluoroethane (Aldrich) and 1.5 gm of α,α,α-trifluorotoluene (Aldrich). The resultant solution was added drop by drop into a solution containing 7.3 gm of tris(2-aminoethyl)amine (Aldrich) in 25 gm of α,α,α-trifluorotoluene and 30 gm of 1,1,2-trichlorotrifluoroethane over 2 hours with stirring at room temperature. The mixture was then stirred for another 8 hours to allow the reaction to complete. The IR spectrum of the crude product clearly indicated the disappearance of C=O vibration for methyl ester at 1780 cm$^{-1}$ and the appearance of C=O vibration for the amide product at 1695 cm$^{-1}$. Solvents were removed by rotary evaporation followed by vacuum stripping at 100° C. for 4–6 hours. The crude product was then dissolved in 50 ml of PFS2 solvent (perfluoropolyether from Solvay Solexis) and extracted with 20 ml of ethyl acetate three times, then dried to yield 17 gm of purified product ($R_f$-amine 1900) which showed excellent solubility in HT200.

Other reactive $R_f$ amines having different molecular weights such as $R_f$-amine4900 (g=about 30), $R_f$-amine2000 (g=about 11), $R_f$-amine800 (g=about 4) and $R_f$-amine650 (g=about 3) were also synthesized according to the same procedure. $R_f$-amine350 was also prepared by the same procedure, except that the Krytox® methyl ester was replaced by $CF_3CF_2CF_2COOCH_3$ (from SynQuest Labs, Alachua, Fla.).

Preparation 2

Synthesis of a Reactive Fluorinated Pyridinium Salt

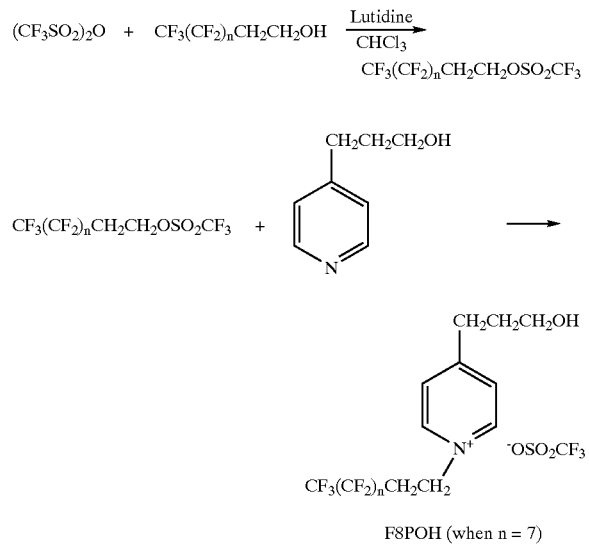

F8POH (when n = 7)

3.21 Gm (30.0 mmol) of 2,6-lutidine (Aldrich) and 11.6 gm (25.0 mmol) of 1H, 1H, 2H, 2H-perfluorodecanol [$CF_3(CF_2)_nCH_2CH_2OH$, n=7] were dissolved in 150 ml of chloroform in a flask and cooled in a 0° C. bath. To the solution, 8.5 gm (30.0 mmol) of trifluoromethanesulfonic anhydride pre-dissolved in 100 ml of chloroform was added drop-wise with stirring over a period of 30 minutes. The mixture was stirred for at least another 8 hours at room temperature to allow the reaction to complete. The reaction mixture was washed with deionized water three times, dried over magnesium sulfate and the solvent was stripped off. The crude product was recrystallized from heptane/methylene chloride and rinsed with heptane. 12.45 Gm (yield: 83.6%) of a white crystal (1H, 1H, 2H, 2H-perfluorodecyl triflate, $CF_3(CF_2)_nCH_2CH_2OSO_2CF_3$, n=7) was obtained.

5.96 Gm (10 mmol) of the thus obtained 1H,1H, 2H, 2H-perfluorodecyl triflate was added into a solution containing 30 ml of methylene chloride and 1.37 gm of (10 mmol) of 4-pyridinepropanol (Aldrich). The reaction mixture was stirred for 6 hours to allow the reaction to complete. After settling, the lower layer was separated and dried. 5.59 Gm of a light yellow solid, 1-(3,3,4,4,5,5,6,6,7,7,8,8,9,9,10,10-heptadecafluoro-decyl)-4-(3-hydroxy-propyl)-pyridinium trifluoromethanesulfonate (hereinafter referred to as F8POH) was obtained.

Other fluorinated pyridinium salts with different alkyl chains, e.g., n=6, n=9, n=11 and a mixture of n=5, 6, 7, 8, etc. were also synthesized according to the same procedure.

Preparations 3–7

The following five Preparations demonstrate the synthesis of fluorinated silicon phthalocyanine dyes.

Preparation 3

Synthesis of Compound (1)

As shown in Scheme 1 below, the 2 step and 1 pot procedure involves conversion of a highly fluorinated ether alcohol (Krytox™ from DuPont) to its sodium salt, followed by, without isolation, reaction with silicon phthalocyanine dichloride (Aldrich).

The Structure of Compound (1)

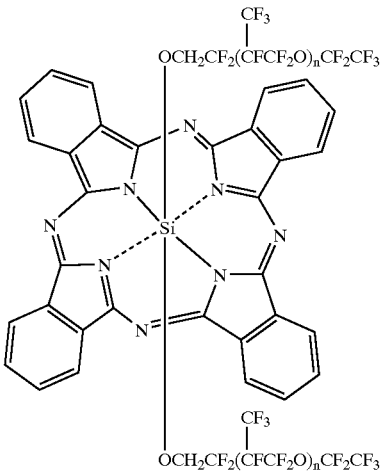

Scheme 1: The synthetic route of Compound (1)

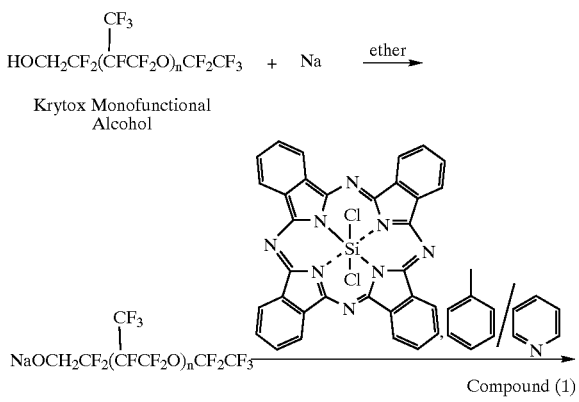

Compound (1)

A mixture of Krytox™ monofunctional alcohol (M.W. 1571, 6.51 g, 4.15 mmol, Du Pont), sodium lump (0.14 g, 6.09 mmol) and anhydrous ether (20 mL) was refluxed for 23 hours under Ar atmosphere. The resulting mixture was added to a suspension of silicon phthalocyanine dichloride [dichloro(29H,3H-phthalocyaninato)silicon], (SiPcCl$_2$; 1.00 g, 1.64 mmol, Aldrich), toluene (80 mL) and pyridine (20 mL), where each had been dried by distillation (~10 mL of distillate) via pipette (without adding unreacted sodium pieces). The resulting mixture was distilled slowly over 24 hours (~40 mL distillate) via a Dean-Stark trap for water removal. The blue suspension obtained was mixed with Al$_2$O$_3$ (activity grade I, neutral, 44 g, Fisher Scientific) and evaporated to dryness by rotary evaporation (60° C.) under pump vacuum (~5 Torr). The resulting blue solid was added to an extraction thimble and extracted with ether (300 mL, Fisher Scientific)) by Soxhlet extraction for 21 hours. The resulting dark blue extract was evaporated to dryness by rotary evaporation (60° C.) under pump vacuum (~5 Torr). A dark blue sticky solid, Compound (1), was obtained (5.66 g, 92%).

Preparation 4

Synthesis of Compound (2)

The Structure of Compound (2)

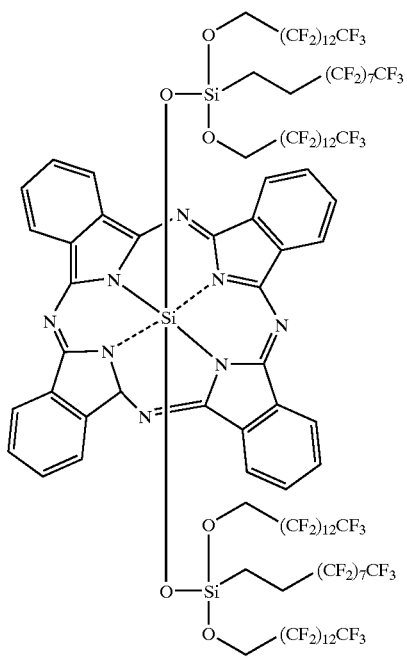

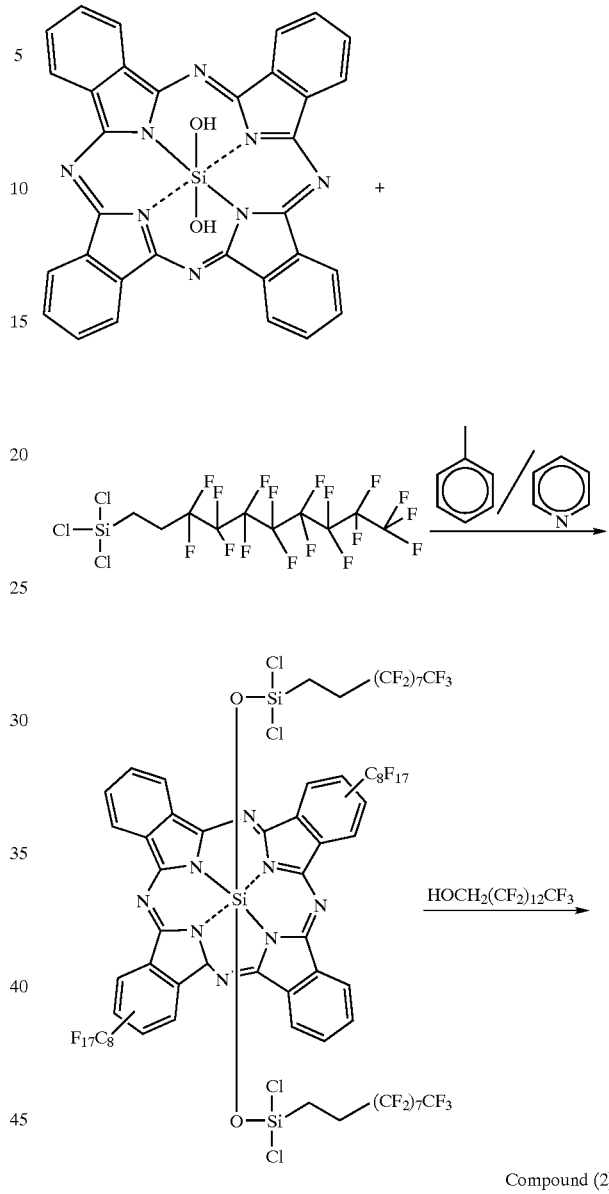

Compound (2)

As shown in Scheme 2, a mixture of (heptadecafluoro-1,1,2,2-tetrahydrodecyl)trichlorosilane (1.30 mL, Gelest) and a suspension of SiPc(OH)$_2$ (0.51 g, 0.87 mmol, Aldrich), toluene (80 mL) and pyridine (20 mL), where each had been dried by distillation (~15 mL of distillate), was refluxed for 14 hours. 1H,1H-Perfluoro-1-tetradecanol (6.21 g, 0.89 mmol, Lancaster) was added to the resulting solution after cooling to room temperature and the mixture was slowly distilled for 23 hours (~15 mL distillate). The blue solution obtained was mixed with Al$_2$O$_3$ (20 g, activity grade I, neutral, Fisher Scientific) and evaporated to dryness by rotary evaporation (60° C.) under pump vacuum (~5 Torr). The resulting blue solid was added into a thimble and was extracted with PFS-2™ (150 mL, Solvay Solexis) by Sohxlet extraction for 6 hours. The resulting dark blue extract was evaporated to dryness by rotary evaporation (60° C.) under pump vacuum (~5 Torr). A dark blue sticky solid, Compound (2), was obtained (3.44 g, yield 91%).

Preparation 5

Synthesis of Compound (3)

The structure of Compound (3)

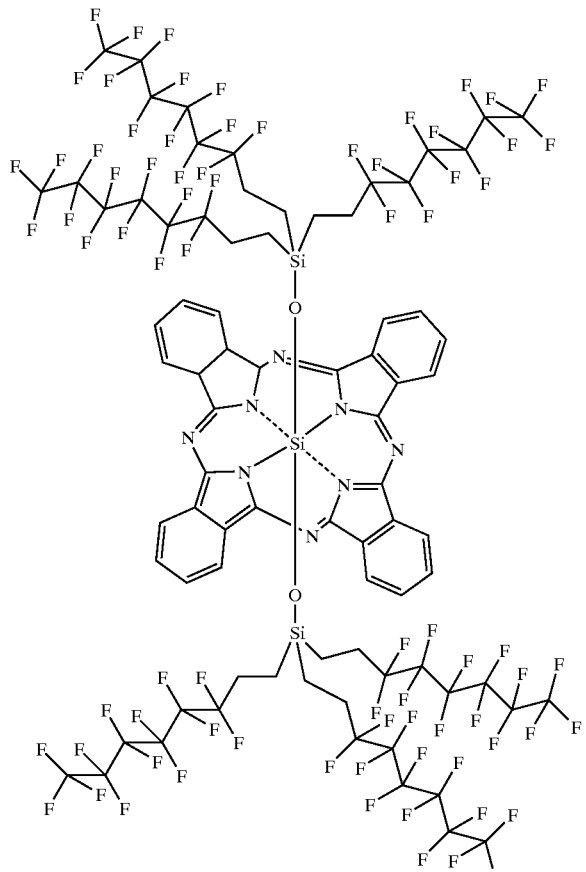

Scheme 3: The synthetic route of Compound (3)

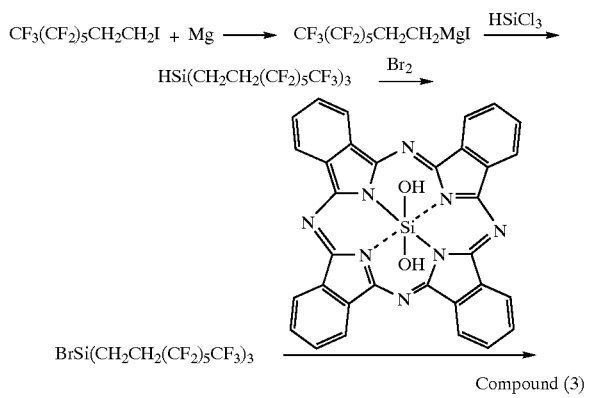

A. Synthesis of Bromosilane (A): BrSi(CH$_2$CH$_2$CF$_2$CF$_2$CF$_2$CF$_2$CF$_2$CF$_3$)$_3$ This procedure was modified from the synthesis described in J. Org. Chem., 1997, 62, 2917–2924. A mixture of magnesium turnings (1.00 g, 40.9 mmol, Aldrich), 2 crystals of iodine (Fisher Scientific) and dry ether (10.0 mL, Fisher Scientific) was refluxed for 40 min, then cooled to room temperature. 1-Iodo-1H,1H, 2H,2H-perfluorooctane (12.2 g, 25.6 mmol, Lancaster) in a dry ether solution (50 mL, Fisher Scientific) was added dropwise into the above mixture over 30 minutes. The mixture was refluxed for 15 hours. Trichlorosilane (0.80 mL, 7.98 mmol, Aldrich) was added into the resulting suspension after cooling and the suspension was refluxed for another 21 hours. The suspension obtained was filtered in order to remove unreacted magnesium turning. The filtrate was combined with a saturated ammonium chloride aqueous solution (30 mL) and the mixture was extracted with PFS-2™ (3×20 mL, Solvay Solexis). The extract was dried over anhydrous sodium sulfate and evaporated to dryness by rotary evaporation (60° C.) under pump vacuum evaporated (~5 Torr). A yellow semisolid obtained was mixed with PFS-2™ 20 mL and to this mixture bromine (0.5 mL, 9.76 mmol, Acros) was added via a syringe. The resulting solution was stirred at room temperature for 14 hours. The dark orange solution obtained was washed with acetone (4×20 mL, Fisher Scientific) and evaporated to dryness by rotary evaporation (60° C.) under pump vacuum (~5 Torr). 8.67 Gm of a yellow semisolid product, Bromosilane (A), was obtained (95% yield based on trichlorosilane).

B. The Synthesis of Compound (3)

As shown in Scheme 3, a mixture of bromosilane (A) and a suspension of SiPc(OH)$_2$ (1.50 g, 2.60 mmol, Aldrich), toluene (150 mL, Fisher Scientific) and pyridine (15 mL, Fisher Scientific), where each had been dried by distillation (~8 mL of distillate), was refluxed for 26 hours, evaporated to dryness by rotary evaporation (60° C.) under pump vacuum (~5 Torr) and mixed with PFS-2™ (50 mL, Solvay Solexis) and Al$_2$O$_3$ III (Neutral, 20 g, Fisher Scientific). The resulting suspension was filtered and the residue was extracted with PFS-2 via a Soxhlet Extractor. The filtrate and extract combined was filtered and the filtrate obtained was evaporated to dryness by rotary evaporation (60° C.) under pump vacuum (1 Torr). A blue, waxy product, Compound (3), was obtained (2.44 gm, 35% yield based on SiPc(OH)$_2$).

Preparation 6

Synthesis of Compound (4)

The Structure of Compound (4)

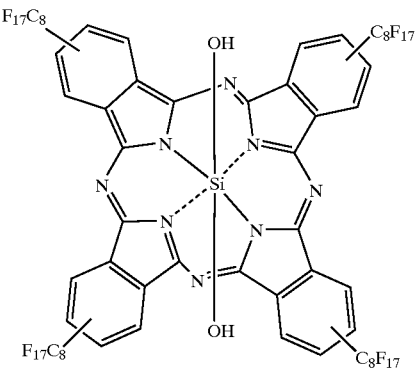

Scheme 4: The synthetic rout of Compound (4)

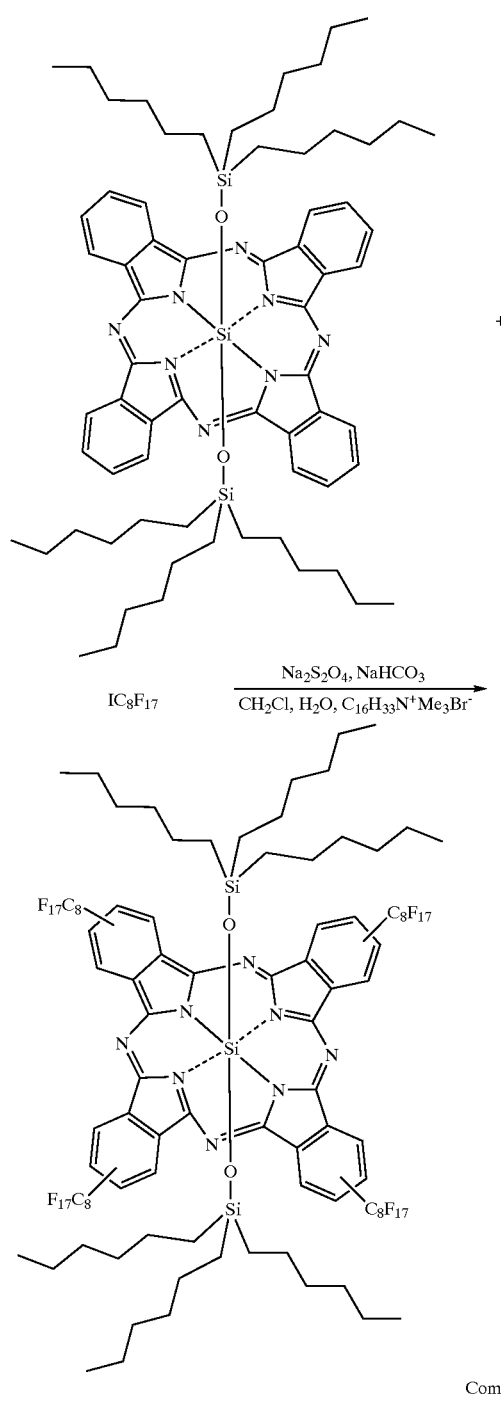

Compound (4)

As shown in Scheme 4, a mixture of sodium dithionite (0.80 g, 4.60 mmol, Fluka) and sodium bicarbonate (0.40 g, 4.76 mmol, Aldrich) was added into a suspension of silicon phthalocyanine bis(trihexylsilyloxide) (0.36 g, 0.30 mmol, Aldrich), cetyl trimethylammonium bromide (0.20 g, Aldrich), CH₂Cl₂ (20 mL, HPLC grade, Fisher Scientist) and distilled water (20 mL). The resulting suspension was vigorously stirred at room temperature for 14 hours. Distilled water (20 mL), acetone (10 mL, Fisher Scientific) and PFS-2™ (10 mL, Solvay Solexis) were added into the mixture obtained. The CH₂Cl₂ and PFS-2™ layer was separated and washed with water (3×20 mL). A concentrated HCl solution (10 mL, Fisher Scientific) and PFS-2™ (100 mL) were added and the resulting mixture was stirred vigorously at room temperature for 16 hours. The PFS-2™ layer was separated, washed with 20 mL of distilled water three times, dried over anhydrous Na₂SO₄ and evaporated to dryness by rotary evaporation (60° C.) under pump vacuum (~5 Torr). The resulting dark blue oil was chromatographed (Al₂O₃ III, neutral, Fisher scientific) on a column of dimensions 1.5×15 cm, eluted with PFS-2™ (Solvay Solexis) first and then with ether (HPLC grade, Fisher Scientific). A dark blue product, Compound (4), was obtained (0.062 gm, 9% yield).

Preparation 7

Synthesis of Compound (5)

The Structure of Compound (5)

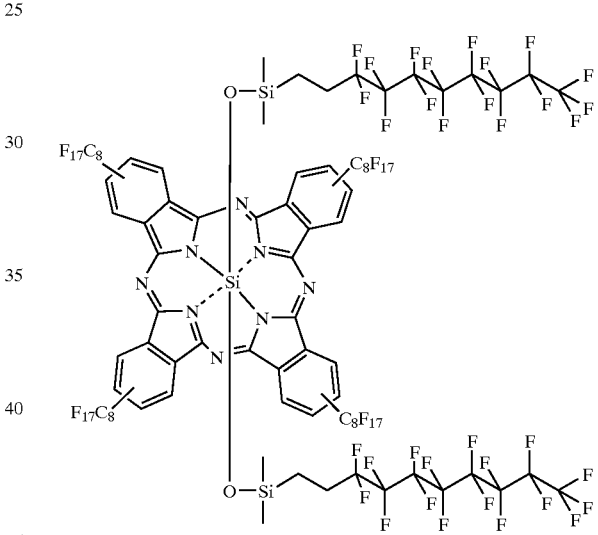

Scheme 5: The synthetic route of Compound (5): SiPc-C₈F₁₇

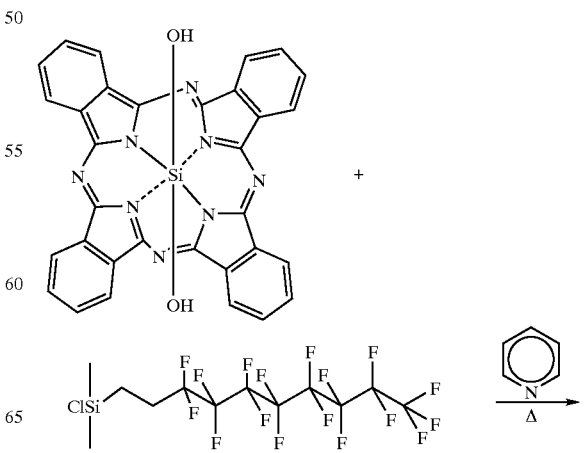

-continued

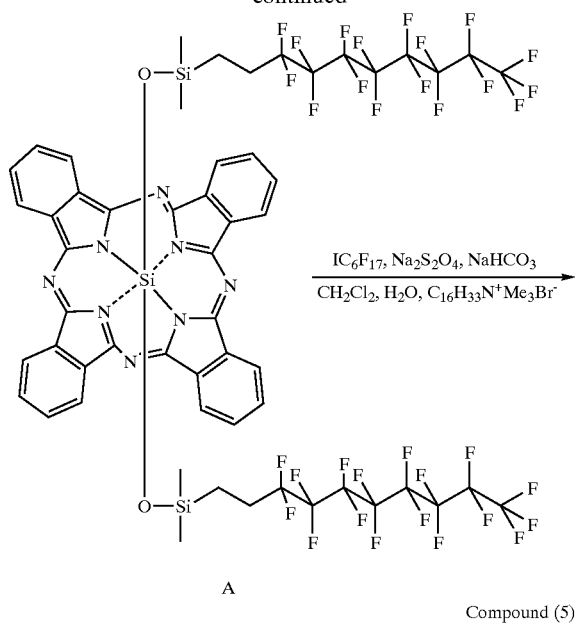

Compound (5)

A. The Synthesis of SiPc(OSi(CH$_3$)$_2$(CH$_2$)$_2$(CF$_2$)$_7$CF$_3$)$_2$

As shown in Scheme 5, a mixture of (heptdecafluoro-1,1,2,2-tetrahydrodecyl)dimethylchlorosilane (2.50 g, 4.63 mmol, Gelest) and a suspension of SiPc(OH)$_2$ (1.00 g, 1.74 mmol, Aldrich) and pyridine (140 mL, Fisher Scientific), where each had been dried by distillation (~10 mL of distillate), was slowly distilled for 5 hours (~55 mL distillate). The resulting dark blue solution was evaporated to dryness by rotary evaporation (60° C.) under pump vacuum (1 Torr). The solid obtained was washed with an EtOH-H$_2$O mixture (1:1, 50 mL) and removed by filtration, dried (60° C., 60 Torr), dissolved in CH$_2$Cl$_2$ (120 mL) and filtered. The filtrate was evaporated to dryness by rotary evaporation (60° C.) under pump vacuum (1 Torr). A blue solid (2.26 g, 82% based on SiPc(OH)$_2$) was obtained.

B. The Synthesis of Compound (5A and 5)

A mixture of sodium dithionite (1.60 g, 9.19 mmol, Fluka) and sodium bicarbonate (0.80 g, 9.52 mmol, Aldrich) was added into a suspension containing the silicon phthalocyanine and SiPc(OSi(CH$_3$)$_2$(CH$_2$)$_2$(CF$_2$)$_7$CF$_3$)$_2$ (2.26 g, 1.43 mmol) obtained from Preparation 7.A above. To the mixture, 1-iodoperfluorooctane (4.0 g, 7.33 mmol, Lancaster), cetyltrimethylammonium bromide (0.20 g, 0.55 mmol, Aldrich), CH$_2$Cl$_2$ (50 mL) and H$_2$O (50 mL) were added while stirring vigorously at room temperature. The mixture obtained was kept stirring at room temperature for 18 hours, and then to which H$_2$O (20 mL) and PFS-2™ (40 mL) were added. The lower organic layer was separated and evaporated to dryness by rotary evaporation (60° C.) under pump vacuum (1 Torr). The dark blue oil obtained was chromatographed using PFS-2™ as the eluent through a column (1×10 cm) packed with Al$_2$O$_3$ III (neutral, Fisher Scientific). The fractions with the blue product were collected and evaporated to dryness by rotary evaporation (60° C.) under vacuum (~5 Torr). A blue solid was obtained (1.41 gm, 30% yield).

In addition to Compound (5A) and Compound (5), small amounts of Compound (6A) and Compound (6) have been identified and isolated from the reaction products.

The Structure of Fluorinated Si Phthalocyanine Compounds (6 and 6A)

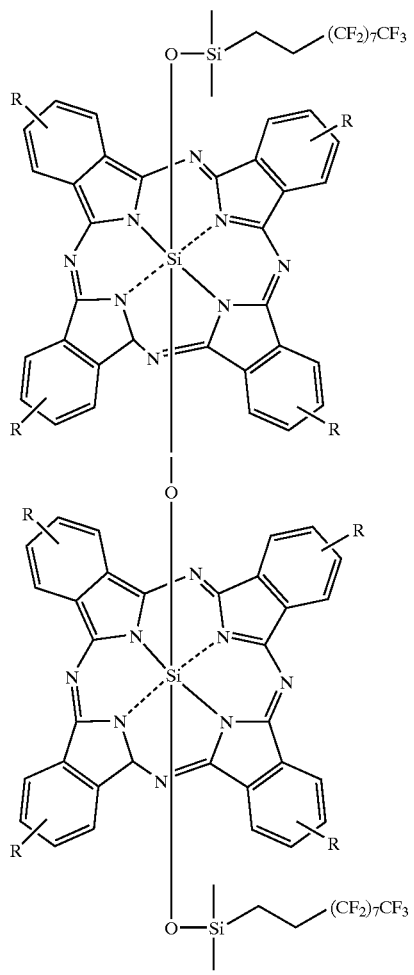

wherein R is H in Compound (6A) or C$_m$H$_n$F$_p$ (m=1–18, n+p≦2m+1) in Compound (6)

Preparation 8

Synthesis of Cu Phthalocyanine Dye (7)
The Structure of Compound (7): CuPc-C$_8$F$_{17}$

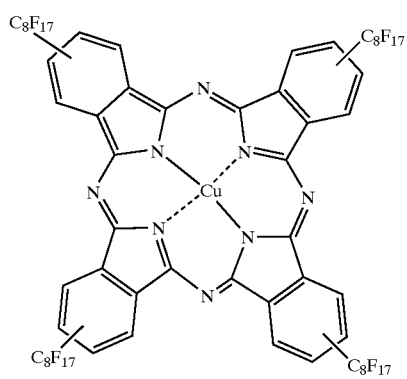

A fluorinated Cu phthalocyanine dye [CuPc-C$_8$F$_{17}$], Compound (7)], was prepared according to U.S. Pat. No. 3,281,426. A mixture of copper phthalocyanine (41.0 g, 71.2 mmole, Aldrich) and 1-iodoperfluorooctane (370 g, 678 mmole, SynQuest) was added into a 1-gallon pressure reactor (Parr Instrument Co.) with a glass liner. The reactor was vacuum sealed at 1 Torr and heated at 375° C. for 3 days. The crude product obtained was mixed with 200 g of Celite (Fisher Scientific) and extracted with 4 L of PFS-2™ in Soxhlet extractor for 5 days. The dark blue solution obtained was washed with 4 L of acetone 3 times and evaporated to dryness by rotary evaporation (60° C.) under vacuum (~5 Torr). A dark blue solid, Compound (7), was obtained (106 g, 66% yield). Perfluorinated Cu naphthalocyanine dyes may be prepared from Cu naphthalocyanines by the same method.

Preparation 9

Preparation of $TiO_2$-Containing Microparticles 9.50 Gm of Desmodur® N3400 aliphatic polyisocyanate (from Bayer AG) and 0.49 gm of triethanolamine (99%, Dow) were dissolved in 3.79 gm of acetone (99.9% minimum by GC, Burdick & Jackson). To the resultant solution, 13 gm of $TiO_2$ R706 (DuPont) was added and homogenized for 2 minutes with a rotor-stator homogenizer (IKA ULTRA-TURRAX T25) at ambient temperature. A solution containing 0.45 gm of F8POH prepared from Preparation 2, 1.67 gm of 1,5-pentanediol (BASF), 1.35 gm of polypropylene oxide (mw=750, from Aldrich) and 2.47 gm acetone (99.9% minimum by GC, Burdick & Jackson) was added and homogenized for 1 minute; and finally 0.32 gm of a 2% solution of dibutyltin dilaurate (Aldrich) in acetone was added and homogenized for an additional minute. To the resultant slurry, 0.9 gm of Rf-amine4900 prepared according to the procedure of Preparation 1 in 40.0 gm of HT-200 (Solvay Solexis) was added, homogenized for 2 minutes, followed by addition of additional 0.9 gm of the Rf-amine4900 and 0.35 gm of a perfluorinated Cu phthalocyanine dye, $CuPc\text{-}C_8F_{17}$, from Preparation 8, in 33.0 gm of HT-200 and homogenization for 2 minutes.

A microcapsule dispersion of low viscosity was obtained. The microcapsule dispersion was then heated at 50° C. overnight and then stirred at 80° C. for an additional hour under low shear to post-cure the particles. The post-cured microcapsule dispersion was filtered through a 400 mesh (38 micrometer) screen and the solid content of the filtered dispersion was measured to be 32% by weight with an IR-200 Moisture Analyzer (Denver Instrument Company). The particle size distribution of the filtered dispersion was measured with the Beckman Coulter LS230 Particle Analyzer. The mean diameter was 1.02 µm and the standard deviation was 0.34 µm.

Preparation 10

Preparation of Microcup Displays
Preparation 10A: Primer Coated Transparent Conductor Film A primer coating solution containing 33.2 gm of EB 600™ (acrylated epoxy oligomer, UCB, Smyrna, GA), 16.12 gm of SR 399™ (pentafunctional monomer, Sartomer, Exton, Pa.), 16.12 gm of TMPTA (UCB, Smyrna, Ga.), 20.61 gm of HDODA (1,6-hexanediol diacrylate, UCB, Smyrna, Ga.), 2 gm of Irgacure™ 369 (2-benzyl-2-(dimethylamino)-1-[4-(4-morpholinyl)phenyl]-1-butanone, Ciba, Tarrytown, N.Y.), 0.1 gm of Irganox™ 1035 (thiodiethylene bis(3,5-di(tert)-butyl4-hydroxyhydrocinnamate, Ciba), 44.35 gm of poly(ethyl methacrylate) (MW. 515,000, Aldrich, Milwaukee, Wis.) and 399.15 gm of MEK (methyl ethyl ketone) was mixed thoroughly and coated onto a 5 mil transparent conductor film (ITO/PET film, 5 mil OC50 from CPFilms, Martinsville, Va.) using a #4 drawdown bar. The coated ITO film was dried in an oven at 65° C. for 10 minutes, then exposed to 1.8 J/cm² of UV light under nitrogen using a UV conveyer (DDU, Los Angles, Calif.).

Preparation 10B: Preparation of Microcups

TABLE 1

| Microcup Composition | | |
|---|---|---|
| Component | Weight Part | Source |
| EB 600 | 33.15 | UCB |
| SR 399 | 32.24 | Sartomer |
| HDDA | 20.61 | UCB |
| EB1360 | 6.00 | UCB |
| Hycar X43 | 8.00 | BF Goodrich |
| Irgacure 369 | 0.20 | Ciba |
| ITX | 0.04 | Aldrich |
| Antioxidant Ir1035 | 0.10 | Ciba |

33.15 Gm of EB 600™ (UCB, Smyrna, Ga.), 32.24 gm of SR 399™ (Sartomer, Exton, Pa.), 6 gm of EB1360™ (silicone acrylate, UCB, Smyrna, Ga.), 8 gm of Hycar 1300×43 (reactive liquid polymer, Noveon Inc. Cleveland, Ohio), 0.2 gm of Irgacure™ 369 (Ciba, Tarrytown, N.Y.), 0.04 gm of ITX (Isopropyl-9H-thioxanthen-9-one, Aldrich, Milwaukee, Wis.), 0.1 gm of Irganox™ 1035 (Ciba, Tarrytown, N.Y.) and 20.61 gm of HDODA (1,6-hexanediol diacrylate, UCB, Smyrna, Ga.) were mixed thoroughly with a Stir-Pak mixer (Cole Parmer, Vernon, Ill.) at room temperature for about 1 hour and debubbled by a centrifuge at 2000 rpm for about 15 minutes.

The microcup composition was slowly coated onto a 4"×4" electroformed Ni male mold for an array of 72 µm (length)×72 µm (width)×35 µm (depth)×13 µm (width of top surface of the partition wall between cups) microcups. A plastic blade was used to remove excess of fluid and gently squeeze it into "valleys" of the Ni mold. The coated Ni mold was heated in an oven at 65° C. for 5 minutes and laminated with the primer coated ITO/PET film prepared in Preparation 10A, with the primer layer facing the Ni mold using a GBC Eagle 35 laminator (GBC, Northbrook, Ill.) preset at a roller temperature of 100° C., lamination speed of 1 ft/min and the roll gap at "heavy gauge". A UV curing station with a UV intensity of 2.5 mJ/cm² was used to cure the panel for 5 seconds. The ITO/PET film was then peeled away from the Ni mold at a peeling angle of about 30 degree to give a 4"×4" microcup array on ITO/PET. An acceptable release of the microcup array from the mold was observed. The thus obtained microcup array was further post-cured with a UV conveyor curing system (DDU, Los Angles, Calif.) with a UV dosage of 1.7 J/cm².

Preparation 10C: Filling and Sealing with a Sealing Composition

1 Gm of an electrophoretic fluid containing 6% by weight (dry weight) of the $TiO_2$ microcapsules prepared according to the Preparation 9 and 1.3% by weight of the perfluorinated Cu-phthalocyanine dye ($CuPc\text{-}C_8F_{17}$ from Preparation 8) in HT-200 (Solvay Solexis) was filled into the 4"×4" microcup array prepared from Preparation 10B using a #0 drawdown bar. The excess of fluid was scraped away by a rubber blade.

A sealing composition was then overcoated onto the filled microcups using a Universal Blade Applicator and dried at room temperature to form a seamless sealing layer of about 2–3 µm dry thickness with good uniformity. The sealing solution was prepared by mixing 0.48 parts by weight of KFG1901x (from Shell Elastomer LLC), 0.91 parts of KRPG6919 (from Shell Elastomer LLC), and 8.19 parts of KG1650 (From Shell Elastomer LLC) with 79.9 parts of Isopar E (from Exxon Mobil) and 8.88 parts of isopropyl acetate. Then, to the mixture, 0.043 parts of BYK142 and 0.18 parts of SL7500 were added. Resulting solution was mixed by a Silverson mixer at 10500 rpm for 3 mm. 1.43 Parts of carbon black, VXC72 (from Cabot Corp.), was added to the solution under mixing. Mixing was continued for 45 min at 10500 rpm. Final dispersion was filtrated through 20 µm filter and ready for use.

Preparation 10D: Lamination of Electrode Layer

The ITO side of an ITO/PET conductor film (5 mil OC50 from CPFilms) was overcoated with an adhesive solution containing 10 parts by weight of a solution of 25% Orasol™ Black RLI (from Ciba Specialty chemicals) in MEK, 20 parts by weight of a Duro-Tak™ 80-1105 adhesive (from National Starch) in 130 parts by weight of MEK, by a drawdown bar.

The coated film was then laminated over the sealed microcups by a laminator at 100° C. at a linear speed of 20 cm/min.

Example 1

Comparative Example

Figure 1B:
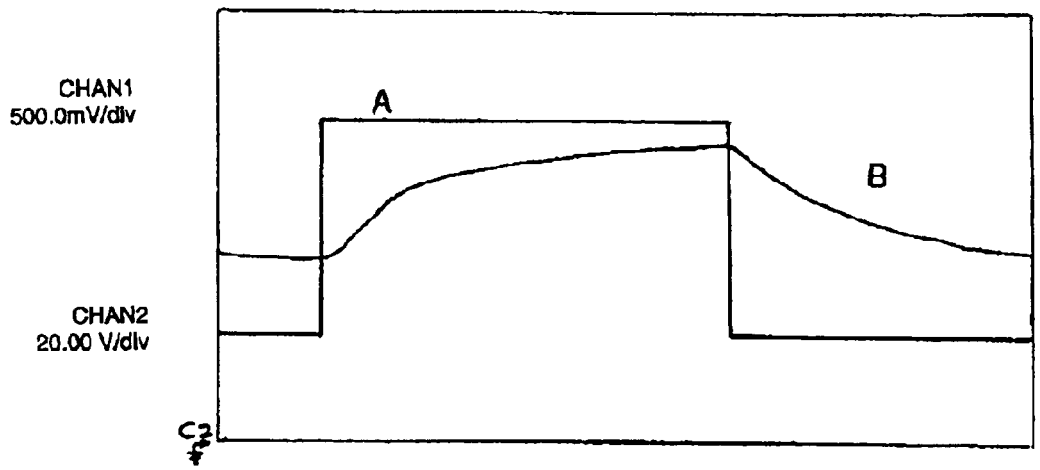
FIG. 1b shows the electro-optical response measured at 0° C.

An electrophoretic fluid containing 6% by weight (dry) of the $TiO_2$-containing microparticles prepared from Preparation 9 and 1.3% by weight (dry) of the perfluorinated Cu phthalocyanine dye, $CuPc-C_8F_{17}$, prepared from Preparation 8 in a perfluoropolyether solvent, HT200 (from Solvay Solexis), was filled and sealed into a microcup display assembly prepared according to Preparation 10. The display thus prepared was laid on a thermoelectric module for controlling the operating temperature of the display. The display was driven at ±20V and 0.2 Hz electrical pulsing waveform. An incoming light from an optical fiber cable connected to a light source was illuminated on the display and the reflecting light was collected and converted into electrical signal by a photo-electric detector and finally the display electro-optic response was displayed on the screen of an oscilloscope. The electro-optic response measured at room temperature and 0° C. by the above setup is shown in FIGS. 1a and 1b respectively. The intensity and the slope of the optical output signal may be correlated directly to the contrast ratio and the response rate of the display respectively. As it can be seen clearly from FIGS. 1a and 1b, the display operated at 0° C. shows a significantly slower response rate with a weaker optical output or contrast ratio than the display operated at room temperature.

Figure 1C:
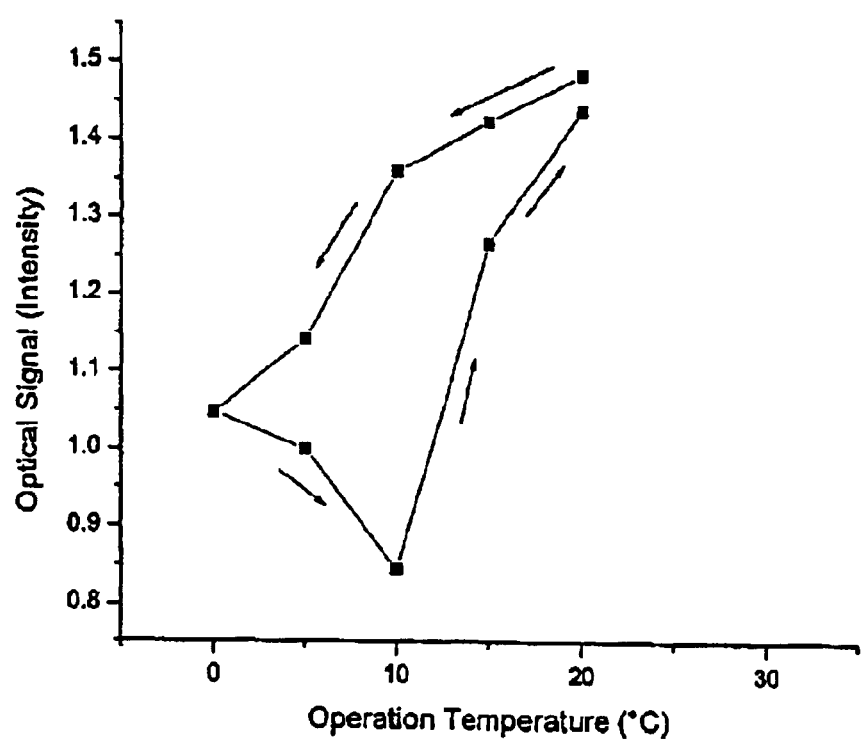
FIG. 1c shows the effect of operation temperature on the intensity of the optical response signal or the contrast ratio.

The optical intensity difference between the ON and OFF states of the sample was plotted against the operating temperature and is shown in FIG. 1c. The arrow indicates the sequence of operating temperature changes. In this case, the temperature sequence of the measurements is 20° C., 15° C., 10° C., 5° C., 0° C., 5° C., 10° C., 15° C. and 20° C. As it can be seen from FIG. 1c that the contrast ratio of the display of Comparative Example 1 containing the Cu phthalocyanine dye alone drops dramatically with decreasing operating temperature. A significant loop of temperature hysteresis was also observed as evident in FIG. 1c.

Example 2

The Effect of Co-Solvents

The procedure of Example 1 was repeated except that 20% by weight of the perfluoropolyether solvent, HT200, was replaced with ZT180 (a hydrofluoropolyether solvent, also from Solvay Solexis).

Figure 2A:
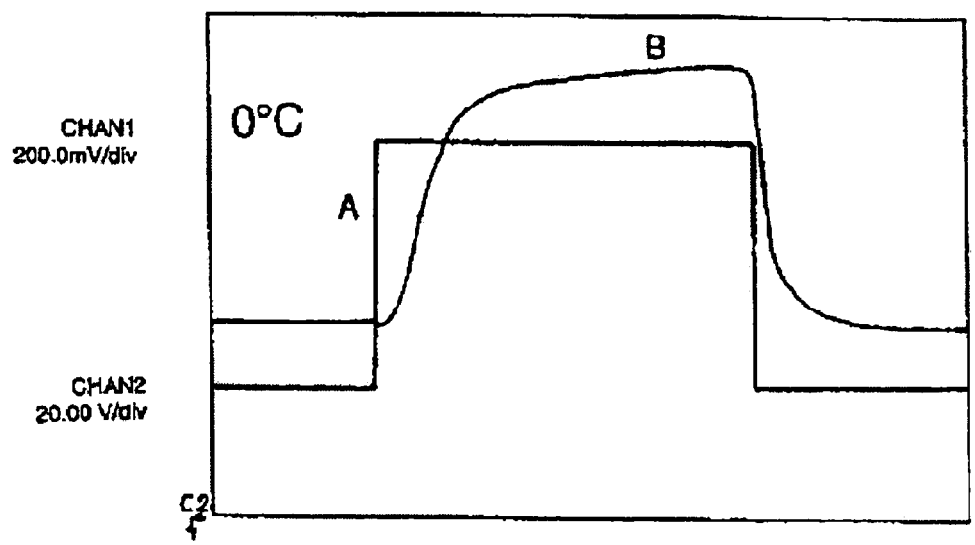
FIGS. 2a and 2b illustrate the effect of a co-solvent (Example 2)
Figure 2B:
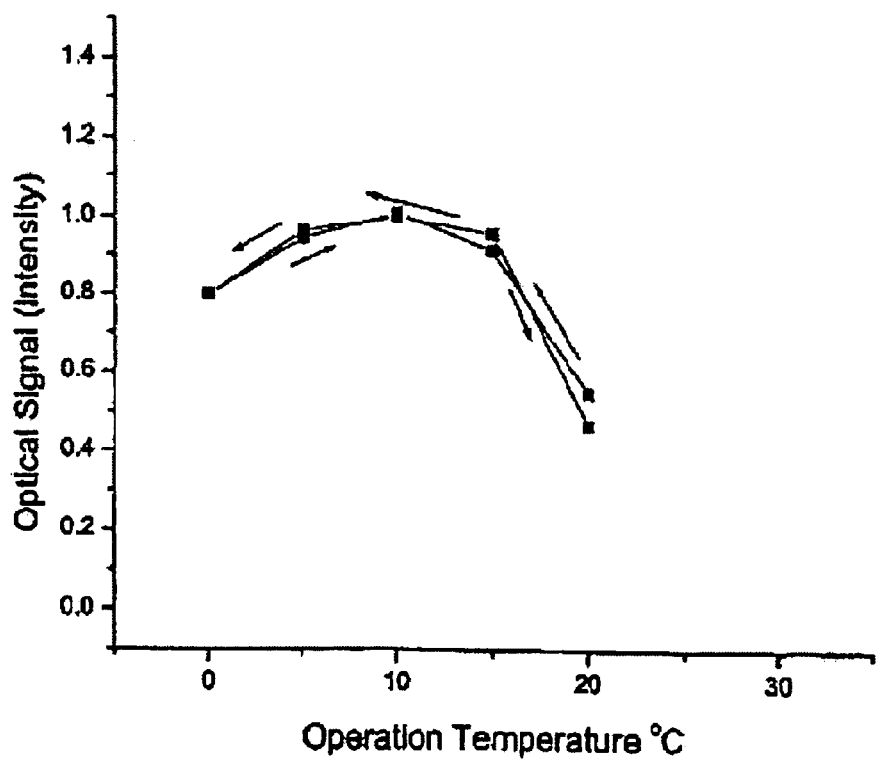

A display prepared with the fluid was evaluated as in Comparative Example 1. As it can be seen in FIGS. 2a and 2b, replacing 20% by weight of the dielectric solvent HT-200 by ZT-180 significantly improves the contrast ratio, response rate and temperature latitude of the display. Neither significant deterioration of display contrast ratio nor the temperature hysteresis was observed when the operating temperature was reduced down to 0° C. from room temperature.

Example 3

The Effect of Dye Mixture

The procedure of Example 1 was repeated except that the Cu phthalocyanine dye was replaced with a mixture of the fluorinated Si phthalocyanine dye (Compound 5, $SiPc-C_8F_{17}$) prepared from Preparation 7 and the perfluorinated Cu phthalocyanine dye, $CuPc-C_8F_{17}$, prepared from Preparation 8. The fluid contained 0.65% by weight (dry) of the $CuPc-C_8F_{17}$ and 0.65% by weight (dry) of the $SiPc-C_8F_{17}$ dye (1:1 ratio).

Figure 3A:
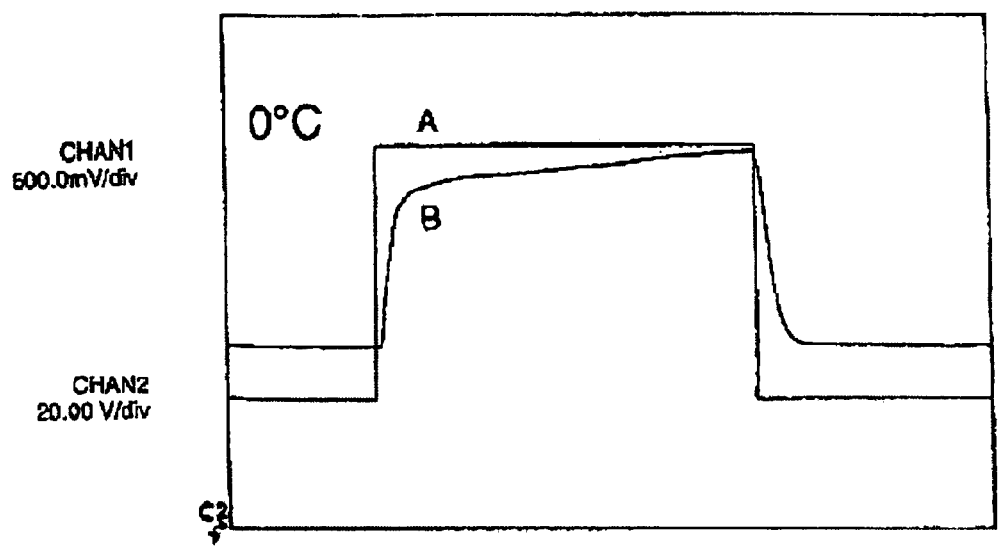
FIGS. 3a and 3b illustrate the effect of dye mixture (Example 3)
Figure 3B:
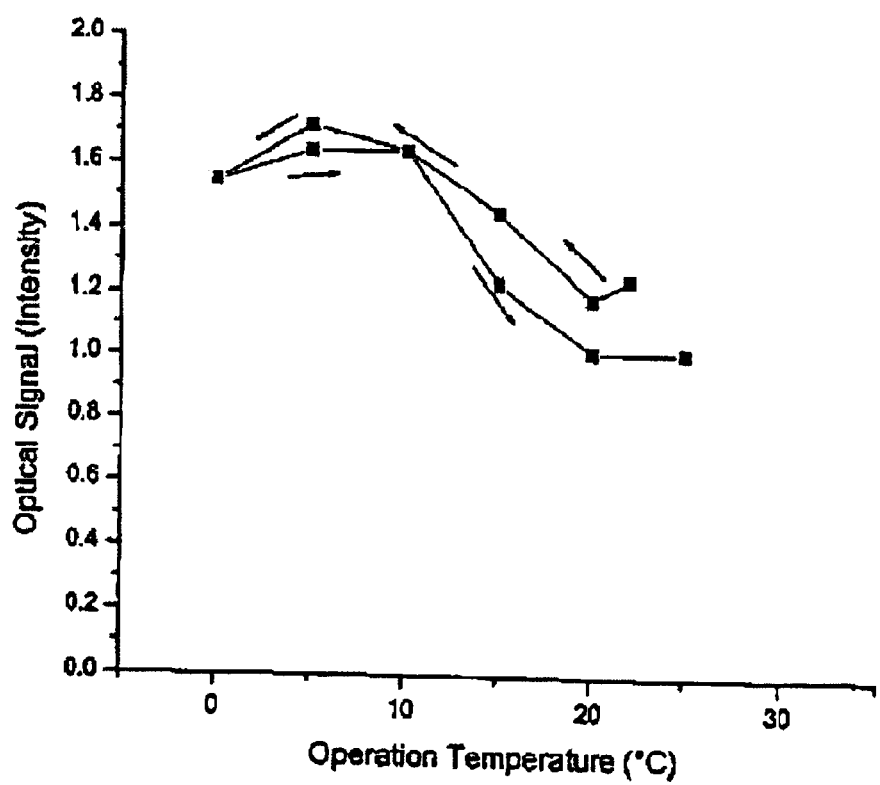

A display prepared with the fluid was evaluated by procedure as in Comparative Example 1. As shown in FIGS. 3a and 3b, the use of the 1:1 fluorinated dye mixture resulted in a significant improvement in contrast ratio and response rate at low temperatures. The display in fact performed better at 0° C. than at room temperature. The temperature hysteresis loop was also significantly reduced by the use of the dye mixture.

Example 4

The Combination Effect

An electrophoretic fluid containing 6 parts (dry) of the $TiO_2$-containing microparticles prepared from Preparation 9, 0.5 part (dry) of the $CuPc-C_8F_{17}$ dye prepared from Preparation 8, 0.5 parts (dry) of fluorinated Si phthalocyanine dye (Compound 5; $SiPc-C_8F_{17}$) prepared from Preparation 7, 18.6 parts of ZT180 and 74.4 parts of HT200 was filled and sealed into a microcup display assembly as in the Comparative Example 1.

Figure 4A:
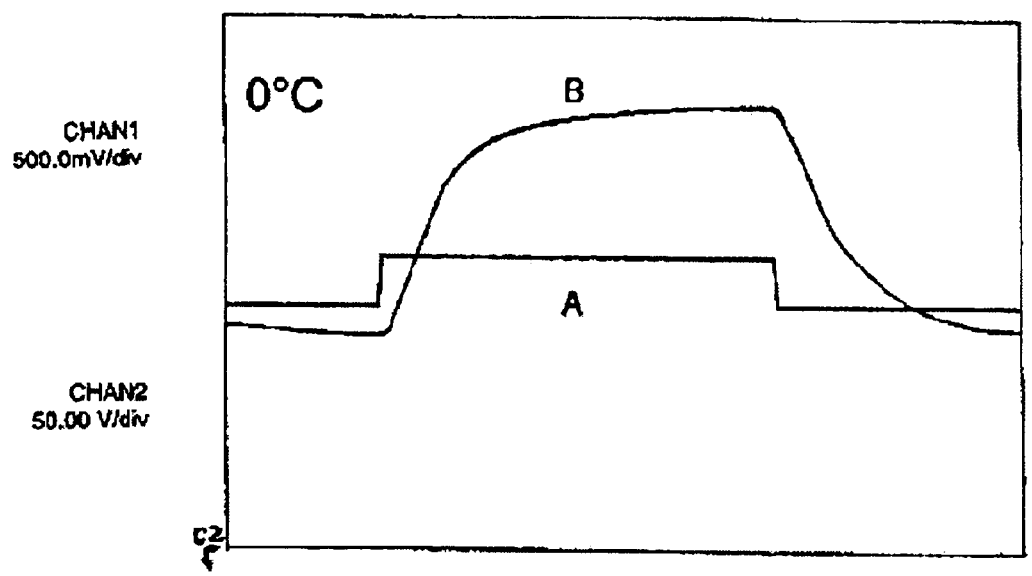
FIGS. 4a and 4b illustrate the combination effect of co-solvent and dye mixture (Example 4)
Figure 4B:
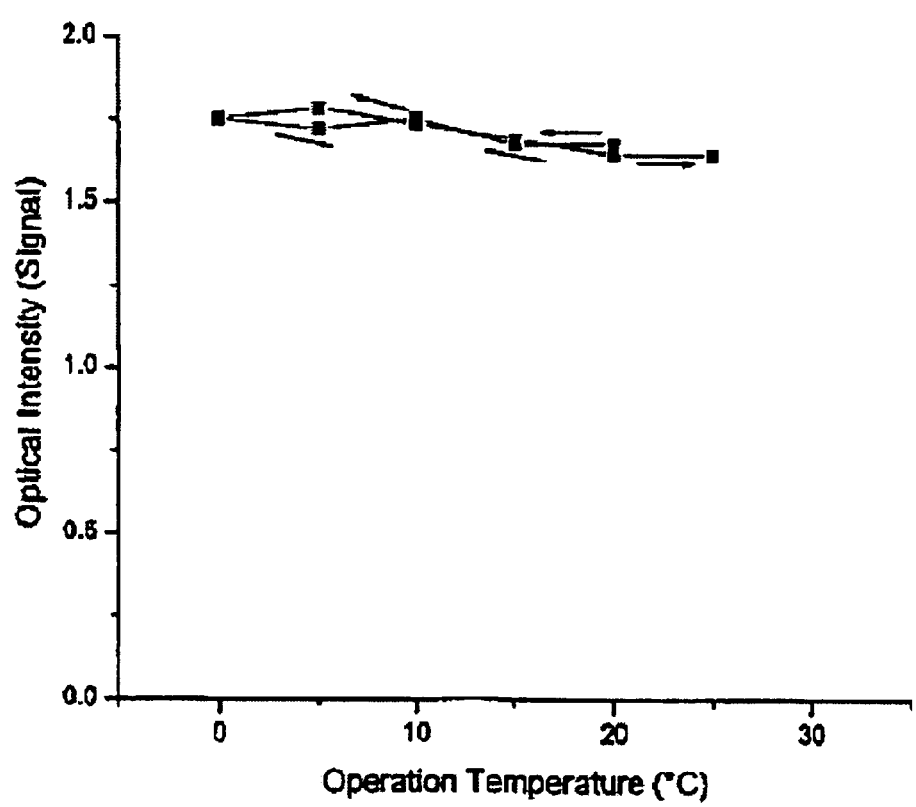

A display prepared with the fluid was evaluated by procedure as in Comparative Example 1. The resultant display shows a significant improvement (FIG. 4a) in the 0° C. performance as compared with the Comparative Example 1. No temperature hysteresis loop was observed between 0–25° C. (FIG. 4b). In fact, the display performance remained essentially unchanged within the entire test temperature range.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. An electrophoretic display fluid comprising charged pigment particles dispersed in a mixture comprising a perfluoropolyether and a hydrofluoropolyether.

2. The display fluid of claim 1 wherein said perfluoropolyether is a homopolymer of trifluoro(trifluoromethyl) oxirane.

3. The display fluid of claim 1 wherein said perfluoropolyether is selected from the group consisting of Dupont K series and Solvay Solexis HT series.

4. The display fluid of claim 3 wherein said perfluoropolyether is selected from the group consisting of Solvay Solexis HT170, HT200, HT230 and Dupont K6 and K7.

5. The display fluid of claim 1 wherein said hydrofluoropolyether is selected from the group consisting of Solvay Solexis ZT series.

6. The display fluid of claim 5 wherein said hydrofluoropolyether is Solvay Solexis ZT180.

7. The display fluid of claim 1 wherein the weight ratio of said hydrofluoropolyethers to said perfluoropolyethers is from about 2/98 to about 98/2.

8. The display fluid of claim 7 wherein said weight ratio is from about 5/95 to about 50/50.

9. The display fluid of claim 8 wherein said weight ratio is from about 8/92 to about 30/70.

10. The display fluid of claim 1 wherein said pigment particles are primary pigment particles or pigment-containing microcapsules or microparticles.

11. The display fluid of claim 10 wherein said pigment is $TiO_2$, $ZnO$, or $BaSO_4$.

12. The display fluid of claim 1 further comprising a mixture of a Si phthalocyanine or naphthalocyanine dye and a Cu phthalocyanine or naphthalocyanine dye dissolved therein.

13. The display fluid of claim 12 wherein said Si phthalocyanine or naphthalocyanine dye is:

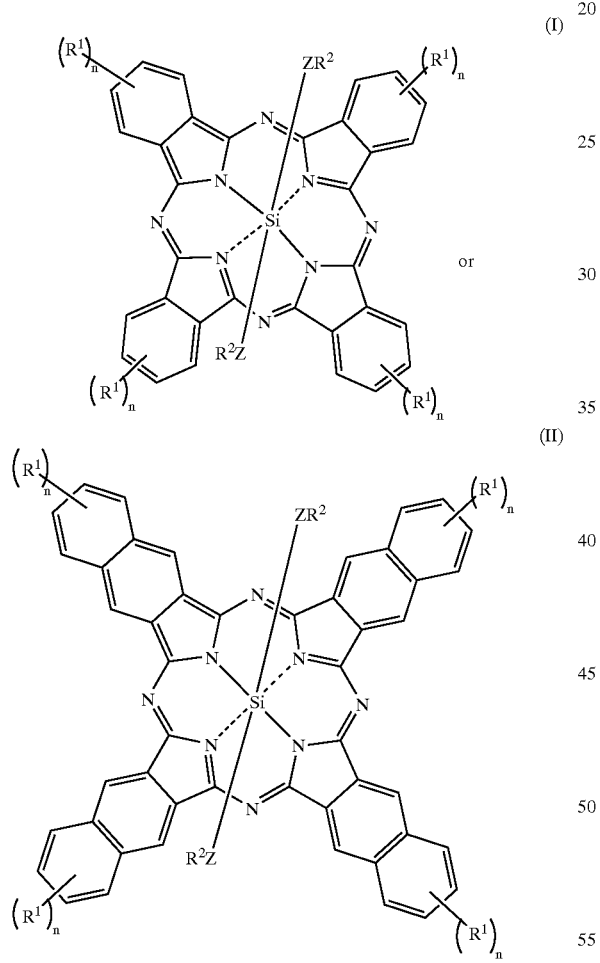

wherein:
each n is individually 0–4 for silicon phthalocyanine (I) or 0–6 for silicon naphthalocyanine (II);

$R^1$ is independently $R_f$-A-(wherein $R_f$ is as defined below and A is a single bond, —$CH_2O$—, —$CH_2CH_2O$— or —CO—), alkyl, heteroalkyl, aryl, heteroaryl, heteroalkylaryl, alkyl-heteroaryl, heteroarylalkyl aryl-heteroalkyl, R'O—, R'S—, R'R"N—, R'CO—, R'OCO—, R'COO—, R'CONR"—, R'R"NCO—, R'NHCONR"—, R'$SO_2$NR"— or R'R"N$SO_2$— (in which R' and R" are independently hydrogen, $R_f$ (as defined below), alkyl, heteroalkyl, aryl, heteroaryl, heteroarylalkyl, aryl-heteroalkyl, heteroalkyaryl or alkyl-heteroaryl) or halogenated, particularly fluorinated derivatives thereof;

Z is O or NR' wherein R' is defined as above;

$R^2$ is hydrogen, $R_f$—B— (wherein $R_f$ is as defined below and B is a single bond, —$CH_2$— or —$CH_2CH_2$—), alkyl, heteroalkyl or halogenated, particularly fluorinated derivatives thereof, or —$SiR^3R^4R^5$ wherein $R^3$, $R^4$, and $R^5$ are independently an alkyl or fluoroalkyl group of 1 to 20 carbon atoms or alkoxy or fluoroalkoxy of 2 to 40 carbon atoms; and $R_f$ is a low molecular weight (100–100,000) fluorinated polymeric or oligomeric moiety prepared from one or more types of fluorinated monomers.

14. The display fluid of claim 13 wherein said Si phthalocyanine dye is:

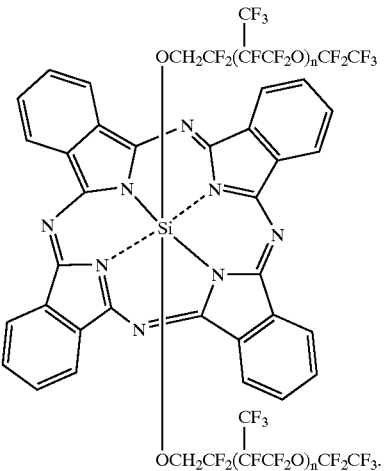

15. The display fluid of claim 13 wherein said Si phthalocyanine dye is:

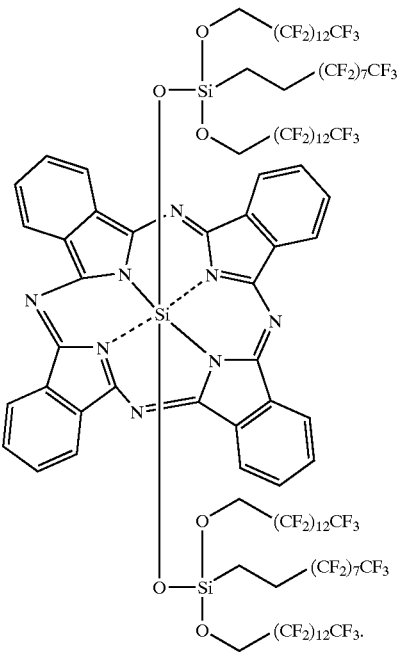

16. The display fluid of claim 13 wherein said Si phthalocyanine dye is:
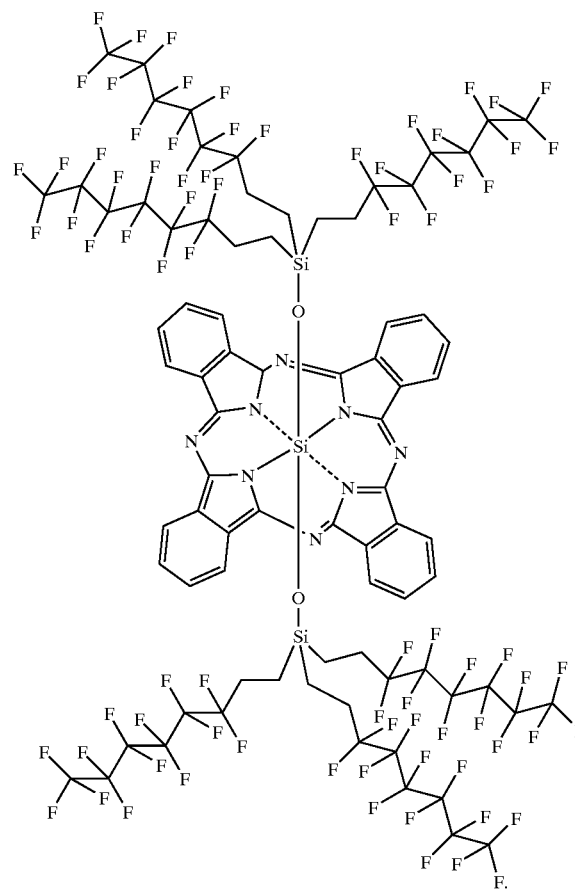
17. The display fluid of claim 13 wherein said Si phthalocyanine dye is:
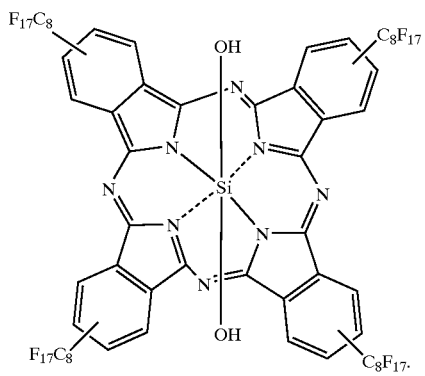
18. The display fluid of claim 13 wherein said Si phthalocyanine dye is:
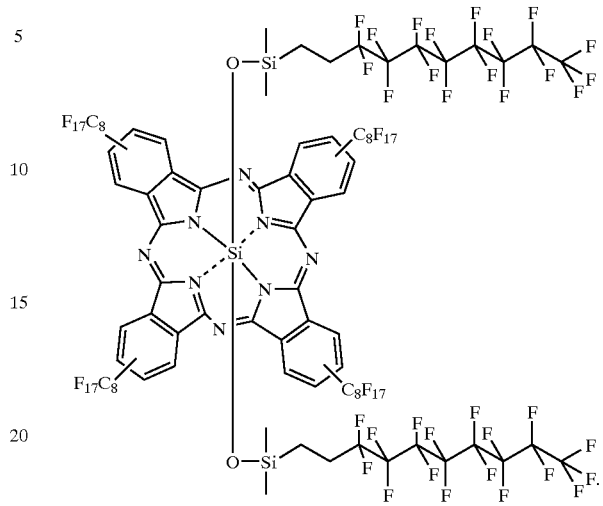
19. The display fluid of claim 12 wherein said Si phthalocyanine dye is:
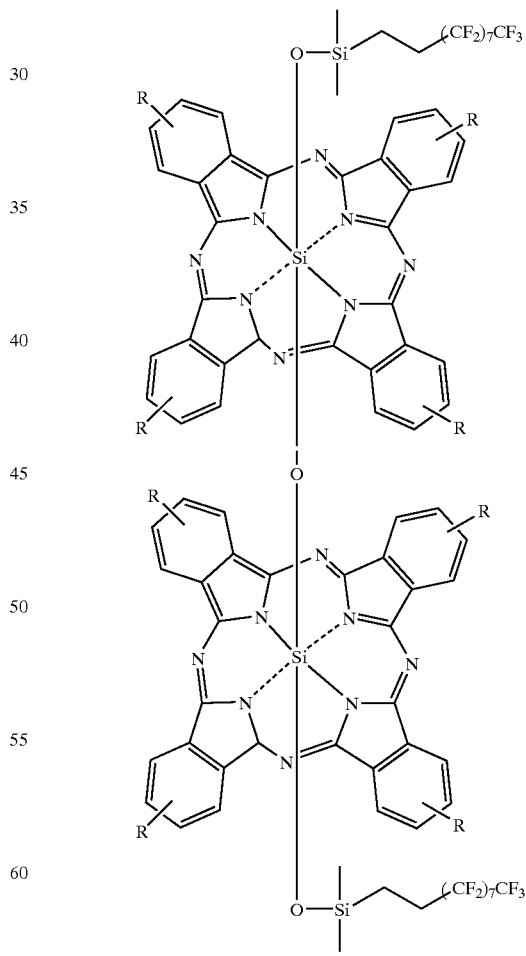
wherein R is H or $C_mH_nF_p$ in which m is 1–18 and $n+p \leq 2m+1$.

20. The display fluid of claim 12 wherein said Cu phthalocyanine dye is:

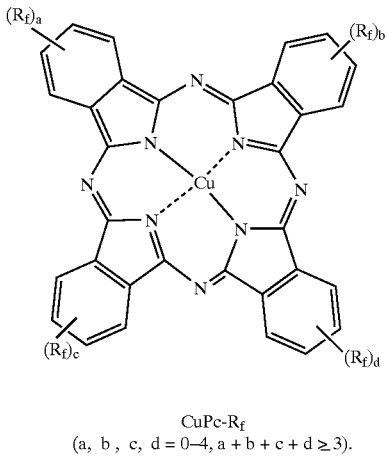

CuPc-R$_f$
(a, b, c, d = 0–4, a + b + c + d ≥ 3).

21. The display fluid of claim 20 wherein said Cu phthalocyanine dye is:

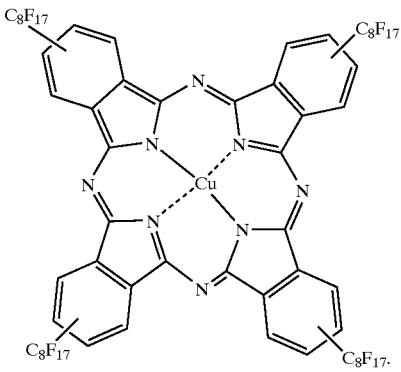

22. The display fluid of claim 12 wherein the weight ratio of the Si dye to the Cu dye is from about 1/10 to about 10/1.

23. The display fluid of claim 22 wherein said weight ratio of the Si dye to the Cu dye is from about 1/4 to about 4/1.

24. The display fluid of claim 23 wherein said weight ratio of the Si dye to the Cu dye is from about 1/2 to about 2/1.

25. An electrophoretic display comprising display cells filled with an electrophoretic display fluid comprising charged pigment particles dispersed in a mixture comprising a perfluoropolyethers and a hydrofluoropolyether.

26. The display of claim 25 wherein said perfluoropolyether is a homopolymer of [trifluoro(trifluoromethyl)oxirane].

27. The display of claim 25 wherein said perfluoropolyether is selected from the group consisting of Dupont K series and Solvay Solexis HT series.

28. The display of claim 27 wherein said perfluoropolyether is selected from the group consisting of Solvay Solexis HT170, HT200, HT230 and Dupont K6 and K7.

29. The display of claim 25 wherein said hydrofluoropolyether is selected from the group consisting of Solvay Solexis ZT series.

30. The display of claim 29 wherein said hydrofluoropolyether is Solvay Solexis ZT180.

31. The display of claim 25 wherein said electrophoretic display fluid further comprising a mixture of a Si phthalocyanine or naphthalocyanine dye and a Cu phthalocyanine or naphthalocyanine dye dissolved therein.

32. The display of claim 31 wherein the weight ratio of the Si dye to the Cu dye is from about 1/10 to about 10/1.

33. The display of claim 32 wherein said weight ratio of the Si dye to the Cu dye is from about 1/4 to about 4/1.

34. The display of claim 33 wherein said weight ratio of the Si dye to the Cu dye is from about 1/2 to about 2/1.

35. The display of claim 25 which is a conventional partition type display, a display prepared by a microencapsulation process or a display prepared by the microcup technology.

* * * * *